(12) United States Patent
Lin et al.

(10) Patent No.: US 10,437,017 B2
(45) Date of Patent: Oct. 8, 2019

(54) PHOTOGRAPHING OPTICAL LENS SYSTEM, IMAGE CAPTURING UNIT AND ELECTRONIC DEVICE

(71) Applicant: LARGAN Precision Co., Ltd., Taichung (TW)

(72) Inventors: Cheng-Chen Lin, Taichung (TW); Hung-Shuo Chen, Taichung (TW); Tzu-Chieh Kuo, Taichung (TW)

(73) Assignee: LARGAN Precision Co., Ltd., Taichung (TW)

( * ) Notice: Subject to any disclaimer, the term of this patent is extended or adjusted under 35 U.S.C. 154(b) by 325 days.

(21) Appl. No.: 15/439,594

(22) Filed: Feb. 22, 2017

(65) Prior Publication Data

US 2018/0143402 A1     May 24, 2018

(30) Foreign Application Priority Data

Nov. 18, 2016   (TW) .............................. 105137976 A

(51) Int. Cl.
  *G02B 13/00*   (2006.01)
  *G02B 7/09*   (2006.01)
  (Continued)

(52) U.S. Cl.
  CPC ........... *G02B 13/0045* (2013.01); *G02B 7/09* (2013.01); *G02B 9/60* (2013.01); *G02B 13/02* (2013.01);
  (Continued)

(58) Field of Classification Search
  CPC ...... G02B 13/0045; G02B 9/60; G02B 13/18; G02B 3/04; G02B 27/0025; G02B 13/0015; G02B 13/04; G02B 15/14; G02B 13/00; G02B 5/005; G02B 15/173; G02B 13/001; G02B 13/06; G02B 15/177; G02B 7/021;
  (Continued)

(56) References Cited

U.S. PATENT DOCUMENTS 4,838,670 A   6/1989  Ueda et al.
8,358,474 B2  1/2013  Kwon
(Continued)

FOREIGN PATENT DOCUMENTS

CN   106526793 A   3/2017
JP   H10260350    9/1998
(Continued)

*Primary Examiner* — Evan P Dzierzynski
*Assistant Examiner* — Sharrief I Broome
(74) *Attorney, Agent, or Firm* — Hanley, Flight & Zimmerman, LLC

(57) ABSTRACT

A photographing optical lens system includes, in order from an object side to an image side, a first lens element, a second lens element, a third lens element, a fourth lens element and a fifth lens element. The first lens element has positive refractive power. The second lens element has negative refractive power. The fourth lens element with negative refractive power has an object-side surface being convex and an image-side surface being concave in a paraxial region thereof, wherein, either the object-side surface thereof, the image-side surface thereof or both the two surfaces thereof have at least one critical point in an off-axial region thereof, and either the object-side surface thereof, the image-side surface thereof or both the two surfaces thereof are aspheric.

29 Claims, 25 Drawing Sheets

(51) Int. Cl.
  *G02B 9/60* (2006.01)
  *G02B 27/00* (2006.01)
  *G02B 27/64* (2006.01)
  *H04N 5/225* (2006.01)
  *H04N 5/232* (2006.01)
  *G02B 13/02* (2006.01)

(52) U.S. Cl.
  CPC ....... *G02B 27/0025* (2013.01); *G02B 27/646* (2013.01); *H04N 5/2253* (2013.01); *H04N 5/23264* (2013.01)

(58) Field of Classification Search
  CPC .......... G02B 7/08; G02B 13/02; G02B 13/22; G02B 27/646; G02B 9/64
  See application file for complete search history.

(56) References Cited

U.S. PATENT DOCUMENTS

| | | |
|---|---|---|
| 8,462,446 B2 | 6/2013 | Tsai et al. |
| 8,879,167 B2 | 11/2014 | Kubota et al. |
| 9,001,435 B2 | 4/2015 | Tsai et al. |
| 9,223,118 B2 | 12/2015 | Mercado |
| 9,310,585 B2 | 4/2016 | Park |
| 9,316,812 B2 | 4/2016 | Chiang et al. |
| 9,335,521 B2 | 5/2016 | Kubota et al. |
| 9,341,814 B2 | 5/2016 | Kwon |
| 9,341,820 B2 | 5/2016 | Chen et al. |
| RE46,066 E | 7/2016 | Kubota et al. |
| 9,405,099 B2 | 8/2016 | Jo et al. |
| 2013/0057973 A1* | 3/2013 | Kubota ............... G02B 13/0045 359/764 |
| 2014/0015997 A1 | 1/2014 | Baba |
| 2014/0063621 A1* | 3/2014 | Hsueh ................ G02B 13/0045 359/714 |
| 2014/0063622 A1* | 3/2014 | Tsai ....................... G02B 13/18 359/714 |
| 2016/0195694 A1 | 7/2016 | Tang et al. |
| 2016/0195697 A1 | 7/2016 | Tang et al. |
| 2016/0259147 A1 | 9/2016 | Hsueh et al. |
| 2017/0023768 A1* | 1/2017 | Hsieh ....................... G02B 9/60 |
| 2017/0276906 A1 | 9/2017 | Gong et al. |
| 2018/0052306 A1 | 2/2018 | Shi |
| 2018/0059370 A1 | 3/2018 | Chen et al. |
| 2018/0307006 A1 | 10/2018 | Kang et al. |

FOREIGN PATENT DOCUMENTS

| | | |
|---|---|---|
| JP | 2015087495 | 5/2015 |
| WO | 2017034307 A1 | 2/2017 |
| WO | 2017034307 A1 | 3/2017 |
| WO | 2017078255 A1 | 5/2017 |

* cited by examiner

PHOTOGRAPHING OPTICAL LENS SYSTEM, IMAGE CAPTURING UNIT AND ELECTRONIC DEVICE

RELATED APPLICATIONS

This application claims priority to Taiwan Application 105137976, filed Nov. 18, 2016, which is incorporated by reference herein in its entirety.

BACKGROUND

Technical Field

The present disclosure relates to a photographing optical lens system, an image capturing unit and an electronic device, more particularly to a photographing optical lens system and an image capturing unit applicable to an electronic device.

Description of Related Art

In recent years, with the popularity of electronic devices having camera functionalities, the demand of miniaturized optical systems has been increasing. As the advanced semiconductor manufacturing technologies have reduced the pixel size of sensors, the compact optical systems have gradually evolved toward the field of higher megapixels. Since there is an increasing demand for the electronic devices featuring compactness and better imaging functionality, the compact optical systems featuring high image quality has become the mainstream product in the market.

For various applications, the optical systems are developed with various optical characteristics, and have been widely applied to different kinds of electronic devices. With the development of portable electronic devices, the demand of telephoto cameras has been increasing. For example, a smart phone can be equipped with dual cameras or multiple cameras, and the dual cameras and multiple cameras can be applied to some applications which a single camera is difficult to be applied to. Specifically, a wide angle camera can be cooperated with a camera having small field of view, or multiple cameras having similar fields of view can be cooperated with each other.

However, in the conventional optical system having small field of view and telephoto effect, due to the characteristic of long focal length, it is difficult to obtain a balance between compactness and high image quality. Thus, there is a need to develop an optical system featuring compact size, high image quality, small field of view and telephoto effect.

SUMMARY

According to one aspect of the present disclosure, a photographing optical lens system includes, in order from an object side to an image side, a first lens element, a second lens element, a third lens element, a fourth lens element and a fifth lens element. The first lens element has positive refractive power. The second lens element has negative refractive power. Either an object-side surface of the third lens element, an image-side surface of the third lens element or both the object-side surface and the image-side surface of the third lens element are aspheric. The fourth lens element with negative refractive power has an object-side surface being convex in a paraxial region thereof and an image-side surface being concave in a paraxial region thereof, wherein, either the object-side surface of the fourth lens element, the image-side surface of the fourth lens element or both the object-side surface and the image-side surface of the fourth lens element have at least one critical point in an off-axial region thereof, and either the object-side surface of the fourth lens element, the image-side surface of the fourth lens element or both the object-side surface and the image-side surface of the fourth lens element are aspheric. The photographing optical lens system has a total of five lens elements. When an Abbe number of the third lens element is V3, an Abbe number of the fifth lens element is V5, the following condition is satisfied:

$20.0 < V3+V5 < 70.0$.

According to another aspect of the present disclosure, an image capturing unit includes the aforementioned photographing optical lens system, a driving device and an image sensor, wherein the driving device is disposed on the photographing optical lens system, and the image sensor is disposed on an image surface of the photographing optical lens system.

According to still another aspect of the present disclosure, an electronic device includes the aforementioned image capturing unit.

According to yet still another aspect of the present disclosure, a photographing optical lens system includes, in order from an object side to an image side, a first lens element, a second lens element, a third lens element, a fourth lens element and a fifth lens element. The first lens element has positive refractive power. The second lens element has negative refractive power. The fourth lens element with negative refractive power has an object-side surface being convex in a paraxial region thereof and an image-side surface being concave in a paraxial region thereof, wherein, either the object-side surface of the fourth lens element, the image-side surface of the fourth lens element or both the object-side surface and the image-side surface of the fourth lens element have at least one critical point in an off-axial region thereof, and either the object-side surface of the fourth lens element, the image-side surface of the fourth lens element or both the object-side surface and the image-side surface of the fourth lens element are aspheric. The photographing optical lens system has a total of five lens elements. When an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, an Abbe number of the fourth lens element is V4, an Abbe number of the fifth lens element is V5, the following conditions are satisfied:

$0.35 < T34/(T12+T23+T45) < 5.0$; and $1.30 < V4/V5 < 6.00$.

BRIEF DESCRIPTION OF THE DRAWINGS

The disclosure can be better understood by reading the following detailed description of the embodiments, with reference made to the accompanying drawings as follows.

DETAILED DESCRIPTION

A photographing optical lens system includes, in order from an object side to an image side, a first lens element, a second lens element, a third lens element, a fourth lens element and a fifth lens element. The photographing optical lens system has a total of five lens elements.

The first lens element has positive refractive power. Therefore, it is favorable for providing sufficient positive refractive power and reducing a total track length of the photographing optical lens system.

The second lens element has negative refractive power. Therefore, it is favorable for correcting aberrations generated by the first lens element.

Figure 21:
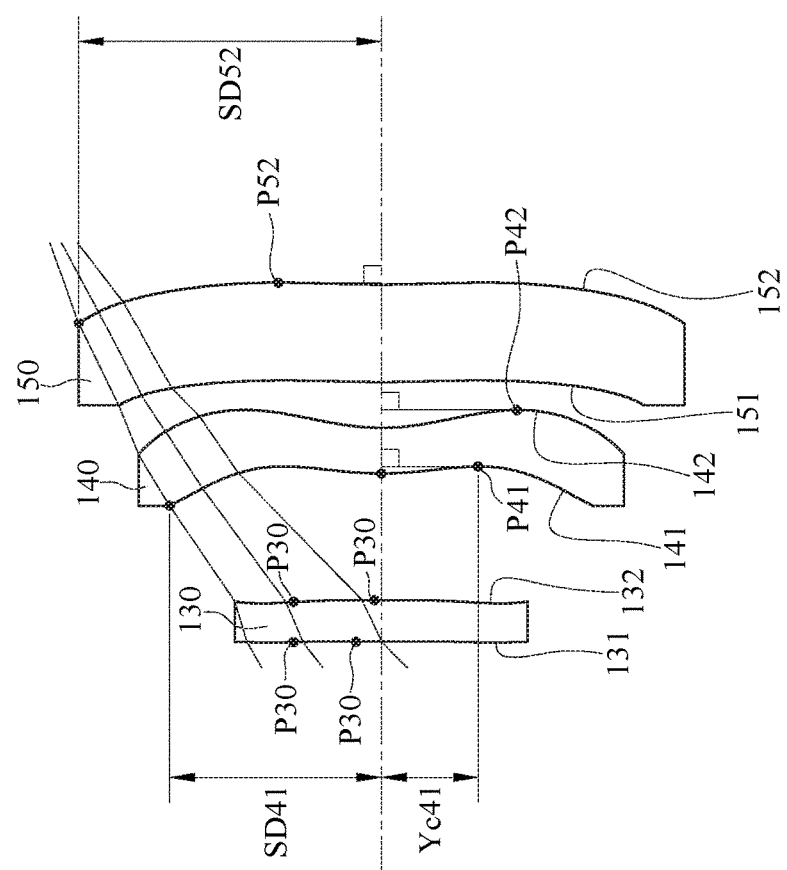
FIG. 21 is a schematic view of inflection points on the third lens element, critical points on the fourth lens element and the fifth lens element, SD41, Yc41 and SD52, according to the 1st embodiment of the present disclosure.

Either an object-side surface of the third lens element, an image-side surface of the third lens element or both the object-side surface and the image-side surface of the third lens element can have at least one inflection point. Therefore, it is favorable for correcting off-axial aberrations while reducing the total track length thereof. As shown in FIG. 21, in the 1st embodiment of the present disclosure, both the object-side surface and the image-side surface of the third lens element have at least one inflection point P30.

The fourth lens element with negative refractive power has an object-side surface being convex in a paraxial region thereof and an image-side surface being concave in a paraxial region thereof, wherein either the object-side surface of the fourth lens element, the image-side surface of the fourth lens element or both the object-side surface and the image-side surface of the fourth lens element have at least one critical point in an off-axial region thereof. Therefore, when a configuration of the photographing optical lens system features short total track length, it is favorable for correcting spherical aberration; furthermore, it is favorable for cooperating with the fifth lens element so as to correct astigmatism and field curvature, thereby enhancing image sharpness and simplifying the computer algorithms for image processing. As shown in FIG. 21, in the 1st embodiment of the present disclosure, the object-side surface of the fourth lens element has at least one critical point P41, and the image-side surface of the fourth lens element has at least one critical point P42.

The fifth lens element can have an object-side surface being convex in a paraxial region thereof or an image-side surface being concave in a paraxial region thereof; therefore, it is favorable for correcting the Petzval sum so as to improve the flatness of an image surface while correcting astigmatism to enhance image sharpness. The image-side surface of the fifth lens element can have at least one convex critical point in an off-axial region thereof; therefore, it is favorable for correcting off-axial aberrations and reducing surface reflection at the peripheral region of the fifth lens element so as to increase peripheral illumination. As shown in FIG. 21, in the 1st embodiment of the present disclosure, the image-side surface of the fifth lens element has at least one convex critical point P52 in an off-axial region thereof.

When an Abbe number of the third lens element is V3, an Abbe number of the fifth lens element is V5, the following condition can be satisfied: $20.0 < V3+V5 < 70.0$. Therefore, it is favorable for properly balancing the Abbe numbers of the third lens element and the fifth lens element so as to correct chromatic aberration, thereby reducing colour cast and improving image quality; also, with a proper Abbe number arrangement, it is favorable for the fifth lens element to be cooperated with the fourth lens element so as to correct other types of aberrations.

When an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, the following condition can be satisfied: $0.35 < T34/(T12+T23+T45) < 5.0$. Therefore, the axial distances between each adjacent lens element are properly arranged, so that it is favorable for correcting astigmatism and field curvature so as to enhance image sharpness and simplify the computer algorithms for image processing; moreover, it is favorable for obtaining a proper refractive power distribution, reducing the total track length of the photographing optical lens system, increase image surface area, and correcting off-axial aberrations.

Preferably, the following condition can also be satisfied: $0.35<T34/(T12+T23+T45)<1.35$. More preferably, the following condition can also be satisfied: $0.50<T34/(T12+T23+T45)<1.25$.

When an Abbe number of the fourth lens element is V4, the Abbe number of the fifth lens element is V5, the following condition can be satisfied: $1.30<V4/V5<6.00$. Therefore, it is favorable for correcting chromatic aberration; furthermore, when the configuration of the photographing optical lens system features small field of view, it is favorable for the fifth lens element to be cooperated with the fourth lens element so as to correct aberrations, thereby improving image quality.

When a curvature radius of an object-side surface of the second lens element is R3, and a curvature radius of an image-side surface of the second lens element is R4, the following condition can be satisfied: $-2.50<(R3+R4)/(R3-R4)<1.85$. Therefore, the shape of the second lens element is favorable for correcting aberrations generated by the first lens element. Preferably, the following condition can also be satisfied: $-2.50<(R3+R4)/(R3-R4)<0.53$, thus it is favorable for preventing the surfaces of the second lens element from overly curved so as to obtain an easier lens assembly.

When an Abbe number of the second lens element is V2, the Abbe number of the third lens element is V3, the Abbe number of the fifth lens element is V5, the following conditions can be satisfied: $10<V2<28$; $10<V3<28$; and $10<V5<28$. Therefore, it is favorable for properly arranging the Abbe numbers of the second lens element and the third lens element so as to correct chromatic aberration generated by the first lens element; moreover, it is favorable for providing the fifth lens element with a proper Abbe number, so that the fifth lens element is cooperated with the fourth lens element to correct off-axial aberrations.

When a central thickness of the second lens element is CT2, the axial distance between the first lens element and the second lens element is T12, the following condition can be satisfied: $0.25<CT2/T12<1.80$. Therefore, it is favorable for obtaining a proper ratio of the central thickness of the second lens element to the axial distance between the first lens element and the second lens element so as to correct chromatic aberration generated by the first lens element.

When the axial distance between the first lens element and the second lens element is T12, the axial distance between the second lens element and the third lens element is T23, the axial distance between the third lens element and the fourth lens element is T34, the axial distance between the fourth lens element and the fifth lens element is T45, the following conditions can be satisfied: $T12<T34$; $T23<T34$; and $T45<T34$. Therefore, the axial distance between the third lens element and the fourth lens element is sufficiently large for the fourth lens element and the fifth lens element to correct off-axial aberrations and increase image surface area.

When an axial distance between an object-side surface of the first lens element and the image surface is TL, a focal length of the photographing optical lens system is f, the following condition can be satisfied: $0.70<TL/f<1.10$. Therefore, it is favorable for enhancing telephoto effect and obtaining a balance between telephoto effect and compactness, and thus the photographing optical lens system has a sufficient amount of space for accommodating additional opto-components in order to be applicable to more kinds of applications.

When the focal length of the photographing optical lens system is f, a curvature radius of the object-side surface of the fifth lens element is R9, the following condition can be satisfied: $-0.28<f/R9<1.70$. Therefore, it is favorable for preventing the surfaces of the fifth lens element from overly curved so as to reduce the influence of manufacturing tolerance on image quality; furthermore, it is favorable for the shapes of the surfaces of the fourth lens element and the fifth lens element to cooperate with each other in order to correct field curvature.

When the focal length of the photographing optical lens system is f, a maximum effective radius of the image-side surface of the fifth lens element is SD52, the following condition can be satisfied: $1.95<f/SD52<5.0$. Therefore, it is favorable for obtaining a balance between compactness and large image surface area. FIG. 21 shows a schematic view of SD52 according to the 1st embodiment of the present disclosure.

When a composite focal length of the first lens element, the second lens element and the third lens element is f123, a composite focal length of the fourth lens element and the fifth lens element is f45, the following condition can be satisfied: $-1.0<f123/f45<-0.45$. Therefore, it is favorable for balancing the refractive power distribution between the object side and the image side of the photographing optical lens system so as to be flexible to select the materials of the lens elements, thereby correcting aberrations and reduce the total track length.

According to the present disclosure, the object-side surface of the fourth lens element can have at least one concave critical point in an off-axial region thereof. When a vertical distance between the at least one concave critical point on the object-side surface of the fourth lens element and an optical axis is Yc41, a maximum effective radius of the object-side surface of the fourth lens element is SD41, the following condition can be satisfied: $0.05<Yc41/SD41<0.50$. Therefore, it is favorable for correcting off-axial aberrations while reducing surface reflection at the peripheral region of the fourth lens element so as to increase illumination at the periphery of the image surface; also, it is favorable for obtaining a balance between the shapes of the two surfaces of the fourth lens element so as to prevent the surfaces from overly curved, thereby reducing the influence of manufacturing tolerance on the correction of off-axial aberrations. FIG. 21 shows a schematic view of SD41 and Yc41 according to the 1st embodiment of the present disclosure, wherein the critical point P41 on the object-side surface of the fourth lens element is a concave critical point.

According to the present disclosure, a focal length of the first lens element can be less than an absolute value of a focal length of the second lens element, an absolute value of a focal length of the third lens element, an absolute value of a focal length of the fourth lens element and an absolute value of a focal length of the fifth lens element. Therefore, it is favorable for providing light convergence capability and reducing the total track length of the photographing optical lens system.

When the Abbe number of the second lens element is V2, the Abbe number of the third lens element is V3, the Abbe number of the fifth lens element is V5, the following condition can be satisfied: $40.0<V2+V3+V5<90.0$. Therefore, it is favorable for the lens elements to jointly share the responsibility of correcting chromatic aberration, so that each lens element is able to correct other types of aberrations, thereby improving image quality; furthermore, it is favorable for the lens elements to be cooperated with each other by the shape of each surface and the refractive power of each lens element, so as to achieve higher image quality.

According to the present disclosure, the lens elements of the photographing optical lens system can be made of glass or plastic material. When the lens elements are made of glass material, the refractive power distribution of the photographing optical lens system may be more flexible to design. When the lens elements are made of plastic material, manufacturing costs can be effectively reduced. Furthermore, surfaces of each lens element can be arranged to be aspheric, since the aspheric surface of the lens element is easy to form a shape other than a spherical surface so as to have more controllable variables for eliminating aberrations thereof and to further decrease the required number of the lens elements. Therefore, the total track length of the photographing optical lens system can also be reduced.

According to the present disclosure, each of an object-side surface and an image-side surface of a lens element has a paraxial region and an off-axial region. The paraxial region refers to the region of the surface where light rays travel close to the optical axis, and the off-axial region refers to the region of the surface away from the paraxial region. Particularly unless otherwise stated, when the lens element has a convex surface, it indicates that the surface can be convex in the paraxial region thereof; when the lens element has a concave surface, it indicates that the surface can be concave in the paraxial region thereof. Moreover, when a region of refractive power or focus of a lens element is not defined, it indicates that the region of refractive power or focus of the lens element can be in the paraxial region thereof.

According to the present disclosure, an image surface of the photographing optical lens system on a corresponding image sensor can be flat or curved, particularly a concave curved surface facing towards the object side of the photographing optical lens system.

According to the present disclosure, the photographing optical lens system can include at least one stop, such as an aperture stop, a glare stop or a field stop. Said glare stop or said field stop is allocated for eliminating the stray light and thereby improving image quality thereof.

According to the present disclosure, an aperture stop can be configured as a front stop or a middle stop. A front stop disposed between the imaged object and the first lens element can produce a telecentric effect by providing a longer distance between an exit pupil and the image surface, thereby improving the image-sensing efficiency of an image sensor (for example, CCD or CMOS). A middle stop disposed between the first lens element and the image surface is favorable for enlarging the view angle and thereby provides a wider field of view.

According to the above description of the present disclosure, the following specific embodiments are provided for further explanation.

1st Embodiment

Figure 1:
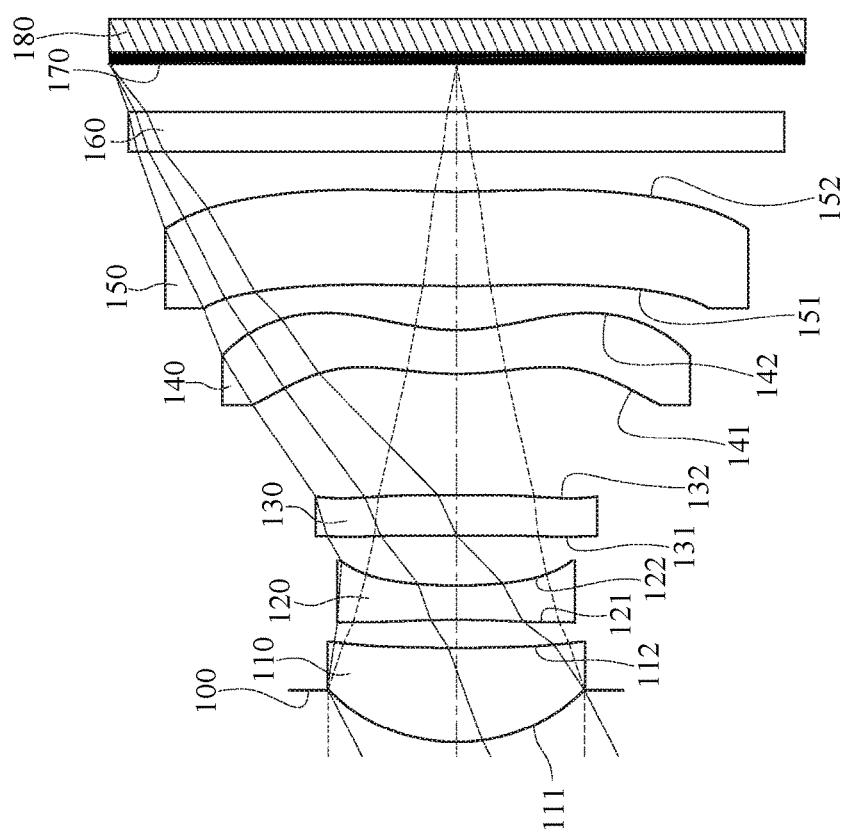
FIG. 1 is a schematic view of an image capturing unit according to the 1st embodiment of the present disclosure.
Figure 2:
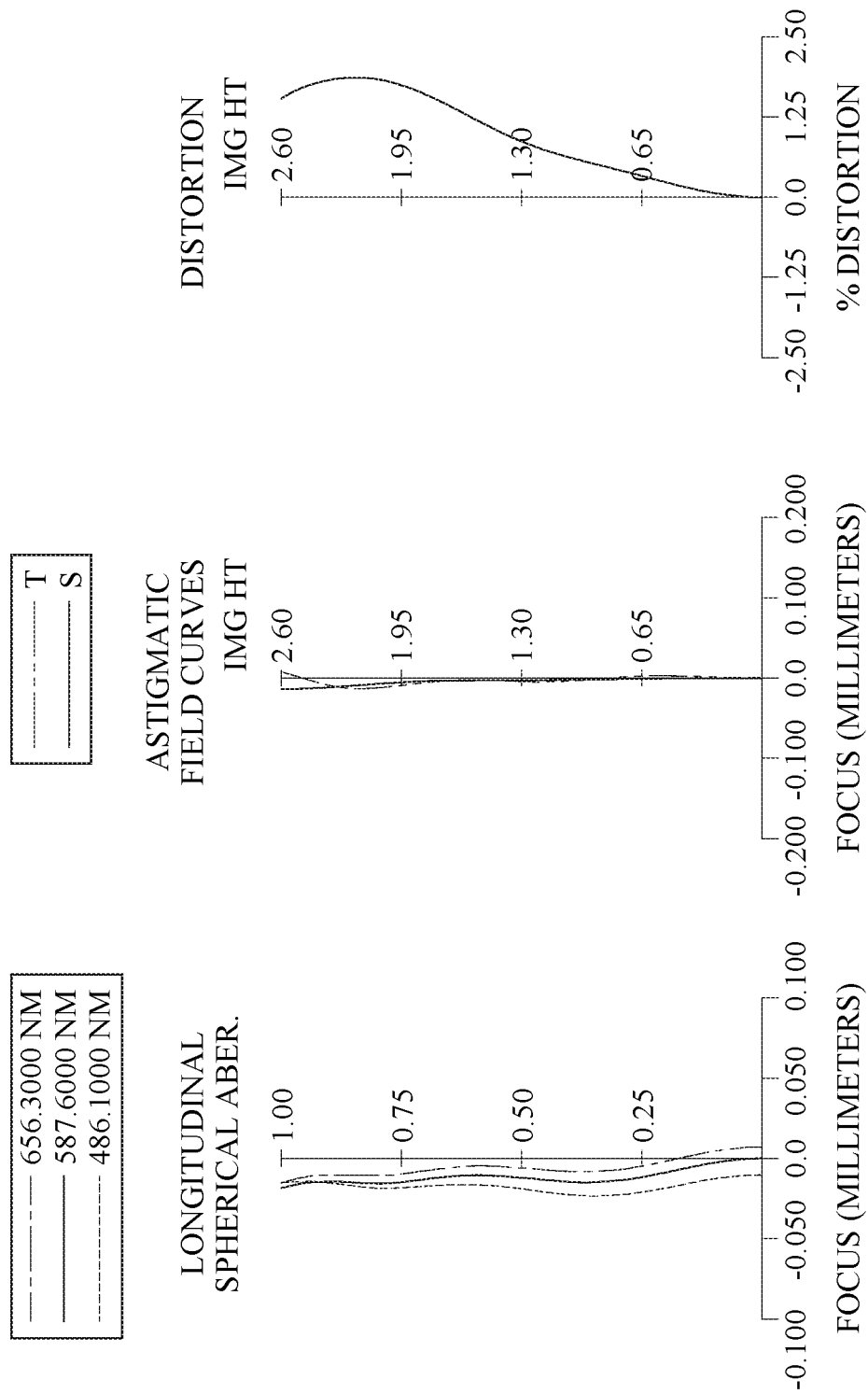
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the photographing optical lens system (its reference numeral is omitted) of the present disclosure and an image sensor 180. The photographing optical lens system includes, in order from an object side to an image side, an aperture stop 100, a first lens element 110, a second lens element 120, a third lens element 130, a fourth lens element 140, a fifth lens element 150, an IR-cut filter 160 and an image surface 170, wherein the photographing optical lens system has a total of five lens elements (110-150).

The first lens element 110 with positive refractive power has an object-side surface 111 being convex in a paraxial region thereof and an image-side surface 112 being concave in a paraxial region thereof. The first lens element 110 is made of plastic material and has the object-side surface 111 and the image-side surface 112 being both aspheric.

The second lens element 120 with negative refractive power has an object-side surface 121 being concave in a paraxial region thereof and an image-side surface 122 being concave in a paraxial region thereof. The second lens element 120 is made of plastic material and has the object-side surface 121 and the image-side surface 122 being both aspheric.

The third lens element 130 with positive refractive power has an object-side surface 131 being convex in a paraxial region thereof and an image-side surface 132 being concave in a paraxial region thereof. The third lens element 130 is made of plastic material and has the object-side surface 131 and the image-side surface 132 being both aspheric. Both the object-side surface 131 and the image-side surface 132 of the third lens element 130 have at least one inflection point.

The fourth lens element 140 with negative refractive power has an object-side surface 141 being convex in a paraxial region thereof and an image-side surface 142 being concave in a paraxial region thereof. The fourth lens element 140 is made of plastic material and has the object-side surface 141 and the image-side surface 142 being both aspheric. The object-side surface 141 of the fourth lens element 140 has at least one concave critical point in an off-axial region thereof. The image-side surface 142 of the fourth lens element 140 has at least one convex critical point in an off-axial region thereof.

The fifth lens element 150 with negative refractive power has an object-side surface 151 being convex in a paraxial region thereof and an image-side surface 152 being concave in a paraxial region thereof. The fifth lens element 150 is made of plastic material and has the object-side surface 151 and the image-side surface 152 being both aspheric. The image-side surface 152 of the fifth lens element 150 has at least one convex critical point in an off-axial region thereof.

The IR-cut filter 160 is made of glass material and located between the fifth lens element 150 and the image surface 170, and will not affect the focal length of the photographing optical lens system. The image sensor 180 is disposed on or near the image surface 170 of the photographing optical lens system.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14 and 16.

In the photographing optical lens system of the image capturing unit according to the 1st embodiment, when a focal length of the photographing optical lens system is f, an f-number of the photographing optical lens system is Fno, and half of a maximum field of view of the photographing optical lens system is HFOV, these parameters have the following values: f=5.05 millimeters (mm); Fno=2.63; and HFOV=26.9 degrees (deg.).

When an Abbe number of the second lens element 120 is V2, the following condition is satisfied: V2=23.3.

When the Abbe number of the second lens element 120 is V2, an Abbe number of the third lens element 130 is V3, an Abbe number of the fifth lens element 150 is V5, the following condition is satisfied: V2+V3+V5=63.2.

When the Abbe number of the third lens element 130 is V3, the following condition is satisfied: V3=20.4.

When the Abbe number of the third lens element 130 is V3, the Abbe number of the fifth lens element 150 is V5, the following condition is satisfied: V3+V5=39.9.

When an Abbe number of the fourth lens element 140 is V4, the Abbe number of the fifth lens element 150 is V5, the following condition is satisfied: V4/V5=2.87.

When the Abbe number of the fifth lens element 150 is V5, the following condition is satisfied: V5=19.5.

When a central thickness of the second lens element 120 is CT2, an axial distance between the first lens element 110 and the second lens element 120 is T12, the following condition is satisfied: CT2/T12=1.24.

When the axial distance between the first lens element 110 and the second lens element 120 is T12, the following condition is satisfied: T12=0.21.

When an axial distance between the second lens element 120 and the third lens element 130 is T23, the following condition is satisfied: T23=0.37.

When an axial distance between the third lens element 130 and the fourth lens element 140 is T34, the following condition is satisfied: T34=0.91.

When the axial distance between the first lens element 110 and the second lens element 120 is T12, the axial distance between the second lens element 120 and the third lens element 130 is T23, the axial distance between the third lens element 130 and the fourth lens element 140 is T34, an axial distance between the fourth lens element 140 and the fifth lens element 150 is T45, the following condition is satisfied: T34/(T12+T23+T45)=1.00.

When the axial distance between the fourth lens element 140 and the fifth lens element 150 is T45, the following condition is satisfied: T45=0.33.

When an axial distance between the object-side surface 111 of the first lens element 110 and the image surface 170 is TL, the focal length of the photographing optical lens system is f, the following condition is satisfied: TL/f=1.01.

When a curvature radius of the object-side surface 121 of the second lens element 120 is R3, a curvature radius of the image-side surface 122 of the second lens element 120 is R4, the following condition is satisfied: (R3+R4)/(R3−R4)=0.38.

When the focal length of the photographing optical lens system is f, a curvature radius of the object-side surface 151 of the fifth lens element 150 is R9, the following condition is satisfied: f/R9=0.49.

When the focal length of the photographing optical lens system is f, a maximum effective radius of the image-side surface 152 of the fifth lens element 150 is SD52, the following condition is satisfied: f/SD 52=2.31.

When a composite focal length of the first lens element 110, the second lens element 120 and the third lens element 130 is f123, a composite focal length of the fourth lens element 140 and the fifth lens element 150 is f45, the following condition is satisfied: f123/f45=−0.48.

When a vertical distance between the at least one concave critical point on the object-side surface 141 of the fourth lens element 140 and an optical axis is Yc41, a maximum effective radius of the object-side surface 141 of the fourth lens element 140 is SD41, the following condition is satisfied: Yc41/SD41=0.46.

The detailed optical data of the 1st embodiment are shown in Table 1 and the aspheric surface data are shown in Table 2 below.

TABLE 1

1st Embodiment
f = 5.05 mm, Fno = 2.63, HFOV = 26.9 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.393 | | | | |
| 2 | Lens 1 | 1.387 (ASP) | 0.710 | Plastic | 1.544 | 56.0 | 2.75 |
| 3 | | 15.864 (ASP) | 0.208 | | | | |
| 4 | Lens 2 | −8.290 (ASP) | 0.258 | Plastic | 1.639 | 23.3 | −3.98 |
| 5 | | 3.708 (ASP) | 0.373 | | | | |
| 6 | Lens 3 | 14.237 (ASP) | 0.304 | Plastic | 1.660 | 20.4 | 23.17 |
| 7 | | 205.211 (ASP) | 0.913 | | | | |
| 8 | Lens 4 | 2.311 (ASP) | 0.328 | Plastic | 1.534 | 55.9 | −10.89 |
| 9 | | 1.572 (ASP) | 0.330 | | | | |
| 10 | Lens 5 | 10.411 (ASP) | 0.707 | Plastic | 1.671 | 19.5 | −124.11 |
| 11 | | 9.002 (ASP) | 0.300 | | | | |
| 12 | IR-cut filter | Plano | 0.300 | Glass | 1.517 | 64.2 | — |
| 13 | | Plano | 0.361 | | | | |
| 14 | Image | Plano | — | | | | |

Note:
Reference wavelength is 587.6 nm (d-line).

TABLE 2

Aspheric Coefficients

| Surface # | 2 | 3 | 4 | 5 | 6 |
|---|---|---|---|---|---|
| k = | −2.0155E−01 | 9.0000E+01 | −3.4906E+01 | −2.5160E+01 | −9.9000E+01 |
| A4 = | 1.0120E−02 | −1.7389E−02 | −1.5229E−02 | 4.8823E−02 | −1.9385E−01 |
| A6 = | 8.6683E−03 | 1.1744E−01 | 2.9039E−01 | 4.5622E−01 | 2.8412E−01 |
| A8 = | 1.2226E−02 | −1.8666E−01 | −4.8597E−01 | −1.0710E+00 | −3.3355E−01 |
| A10 = | −1.2597E−02 | 1.9918E−01 | 4.1104E−01 | 2.0249E+00 | 5.3980E−01 |
| A12 = | 1.3184E−02 | −9.7320E−02 | −1.8914E−01 | −2.1921E+00 | −4.7872E−01 |
| A14 = | — | — | — | 1.0177E+00 | 1.4821E−01 |

| Surface # | 7 | 8 | 9 | 10 | 11 |
|---|---|---|---|---|---|
| k = | 9.0000E+01 | −9.2609E−01 | −6.0998E+00 | −7.5834E+00 | 1.2959E+01 |
| A4 = | −1.6187E−01 | −2.7781E−01 | −1.2379E−01 | −7.0140E−02 | −6.6193E−02 |
| A6 = | 2.4076E−01 | 1.1944E−01 | 2.1215E−01 | 3.8012E−02 | 1.5401E−02 |
| A8 = | −2.7962E−01 | −9.3967E−02 | 2.6183E−03 | −1.3302E−02 | 2.5060E−03 |
| A10 = | 3.9112E−01 | 6.7850E−02 | −4.7321E−03 | 2.4302E−03 | −2.7694E−03 |
| A12 = | −2.7712E−01 | −2.5688E−02 | 2.3385E−03 | −1.8113E−04 | 7.1218E−04 |
| A14 = | 6.7885E−02 | 4.7551E−03 | −5.6845E−04 | −3.7519E−06 | −8.1892E−05 |
| A16 = | — | −3.4164E−04 | 5.0007E−05 | −3.7250E−07 | 3.4881E−06 |

In Table 1, the curvature radius, the thickness and the focal length are shown in millimeters (mm). Surface numbers 0-14 represent the surfaces sequentially arranged from the object-side to the image-side along the optical axis. In Table 2, k represents the conic coefficient of the equation of the aspheric surface profiles. A4-A16 represent the aspheric coefficients ranging from the 4th order to the 16th order. The tables presented below for each embodiment are the corresponding schematic parameter and aberration curves, and the definitions of the terms in the tables are the same as Table 1 and Table 2 of the 1st embodiment.

Therefore, an explanation in this regard will not be provided again.

2nd Embodiment

Figure 3:
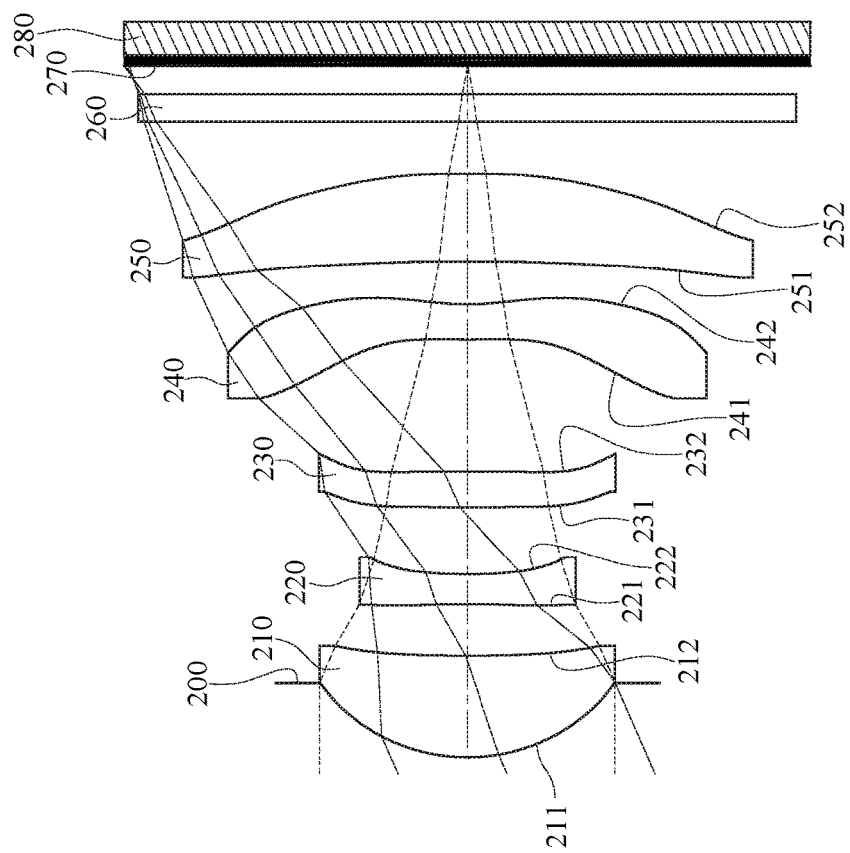
FIG. 3 is a schematic view of an image capturing unit according to the 2nd embodiment of the present disclosure.
Figure 4:
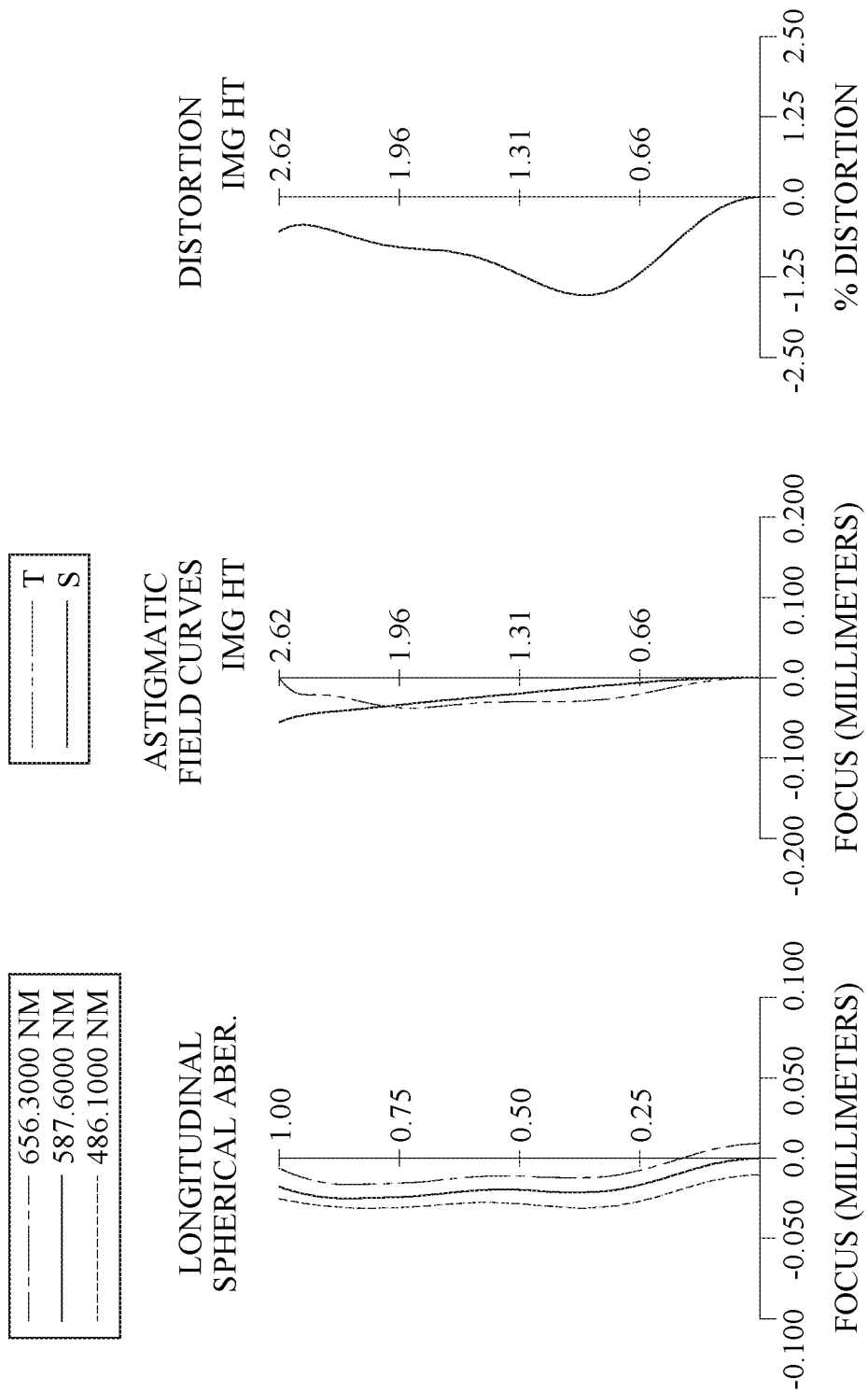
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the photographing optical lens system (its reference numeral is omitted) of the present disclosure and an image sensor 280. The photographing optical lens system includes, in order from an object side to an image side, an aperture stop 200, a first lens element 210, a second lens element 220, a third lens element 230, a fourth lens element 240, a fifth lens element 250, an IR-cut filter 260 and an image surface 270, wherein the photographing optical lens system has a total of five lens elements (210-250).

The first lens element 210 with positive refractive power has an object-side surface 211 being convex in a paraxial region thereof and an image-side surface 212 being concave in a paraxial region thereof. The first lens element 210 is made of plastic material and has the object-side surface 211 and the image-side surface 212 being both aspheric.

The second lens element 220 with negative refractive power has an object-side surface 221 being concave in a paraxial region thereof and an image-side surface 222 being concave in a paraxial region thereof. The second lens element 220 is made of plastic material and has the object-side surface 221 and the image-side surface 222 being both aspheric.

The third lens element 230 with positive refractive power has an object-side surface 231 being convex in a paraxial region thereof and an image-side surface 232 being concave in a paraxial region thereof. The third lens element 230 is made of plastic material and has the object-side surface 231 and the image-side surface 232 being both aspheric. Both the object-side surface 231 and the image-side surface 232 of the third lens element 230 have at least one inflection point.

The fourth lens element 240 with negative refractive power has an object-side surface 241 being convex in a paraxial region thereof and an image-side surface 242 being concave in a paraxial region thereof. The fourth lens element 240 is made of plastic material and has the object-side surface 241 and the image-side surface 242 being both aspheric. The object-side surface 241 of the fourth lens element 240 has at least one concave critical point in an off-axial region thereof. The image-side surface 242 of the fourth lens element 240 has at least one convex critical point in an off-axial region thereof.

The fifth lens element 250 with positive refractive power has an object-side surface 251 being convex in a paraxial region thereof and an image-side surface 252 being convex in a paraxial region thereof. The fifth lens element 250 is made of plastic material and has the object-side surface 251 and the image-side surface 252 being both aspheric.

The IR-cut filter 260 is made of glass material and located between the fifth lens element 250 and the image surface 270, and will not affect the focal length of the photographing optical lens system. The image sensor 280 is disposed on or near the image surface 270 of the photographing optical lens system.

The detailed optical data of the 2nd embodiment are shown in Table 3 and the aspheric surface data are shown in Table 4 below.

TABLE 3

2nd Embodiment
f = 6.03 mm, Fno = 2.66, HFOV = 23.7 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.573 | | | | |
| 2 | Lens 1 | 1.429 (ASP) | 0.781 | Plastic | 1.545 | 56.1 | 2.87 |
| 3 | | 13.380 (ASP) | 0.397 | | | | |
| 4 | Lens 2 | −5.774 (ASP) | 0.230 | Plastic | 1.661 | 20.3 | −4.05 |
| 5 | | 5.052 (ASP) | 0.516 | | | | |
| 6 | Lens 3 | 15.505 (ASP) | 0.274 | Plastic | 1.661 | 20.3 | 25.61 |
| 7 | | 184.720 (ASP) | 1.015 | | | | |
| 8 | Lens 4 | 11.433 (ASP) | 0.270 | Plastic | 1.544 | 56.0 | −4.57 |
| 9 | | 2.026 (ASP) | 0.330 | | | | |
| 10 | Lens 5 | 100.000 (ASP) | 0.677 | Plastic | 1.661 | 20.3 | 17.34 |
| 11 | | −12.899 (ASP) | 0.400 | | | | |
| 12 | IR-cut filter | Plano | 0.210 | Glass | 1.517 | 64.2 | — |
| 13 | | Plano | 0.217 | | | | |
| 14 | Image | Plano | — | | | | |

Note:
Reference wavelength is 587.6 nm (d-line).
An effective radius of the object-side surface 241 (Surface 8) is 1.600 mm.

TABLE 4

Aspheric Coefficients

| Surface # | 2 | 3 | 4 | 5 | 6 |
|---|---|---|---|---|---|
| k = | 9.5786E−02 | −4.5455E+01 | −7.9779E+01 | −2.9290E+01 | 1.0337E+01 |
| A4 = | −3.0705E−03 | 3.5075E−02 | 1.3385E−01 | 2.1893E−01 | −1.0042E−01 |
| A6 = | −3.4447E−03 | −1.7403E−02 | −5.0082E−02 | 2.0624E−01 | 1.3471E−01 |
| A8 = | 8.1339E−04 | 4.3711E−02 | 2.2477E−02 | −9.7324E−01 | 2.1127E−01 |
| A10 = | 2.6667E−03 | −2.4649E−02 | −6.8779E−02 | 2.5916E+00 | −2.7973E−01 |
| A12 = | — | — | — | −3.3233E+00 | 8.3491E−02 |
| A14 = | — | — | — | 1.6070E+00 | — |

| Surface # | 7 | 8 | 9 | 10 | 11 |
|---|---|---|---|---|---|
| k = | 9.2130E+01 | −3.4532E+01 | −2.7690E+00 | 2.5403E+01 | 1.3289E+01 |
| A4 = | −9.7347E−02 | −4.2242E−01 | −4.0920E−01 | −1.1153E−01 | −1.4658E−01 |
| A6 = | 1.9782E−01 | 2.2634E−01 | 3.5876E−01 | 1.5932E−01 | 1.3814E−01 |
| A8 = | −9.1872E−02 | −4.4575E−03 | −2.1212E−01 | −1.1464E−01 | −6.6994E−02 |
| A10 = | 2.5736E−01 | −3.7181E−02 | 8.4023E−02 | 4.5575E−02 | 1.7025E−02 |
| A12 = | −2.8734E−01 | 1.3449E−02 | −2.0844E−02 | −1.0216E−02 | −2.1581E−03 |
| A14 = | 8.9078E−02 | −1.5096E−03 | 2.7576E−03 | 1.2110E−03 | 1.0856E−04 |
| A16 = | — | — | −1.4114E−04 | −5.9015E−05 | — |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 6.03 | T23 | 0.52 |
| Fno | 2.66 | T34 | 1.02 |
| HFOV [deg.] | 23.7 | T34/(T12 + T23 + T45) | 0.82 |
| V2 | 20.3 | T45 | 0.33 |
| V2 + V3 + V5 | 60.9 | TL/f | 0.88 |
| V3 | 20.3 | (R3 + R4)/(R3 − R4) | 0.07 |
| V3 + V5 | 40.6 | f/R9 | 0.06 |
| V4/V5 | 2.76 | f/SD52 | 2.76 |
| V5 | 20.3 | f123/f45 | −0.73 |

-continued

| 2nd Embodiment | | | |
|---|---|---|---|
| CT2/T12 | 0.58 | Yc41/SD41 | 0.15 |
| T12 | 0.40 | — | — |

3rd Embodiment

Figure 5:
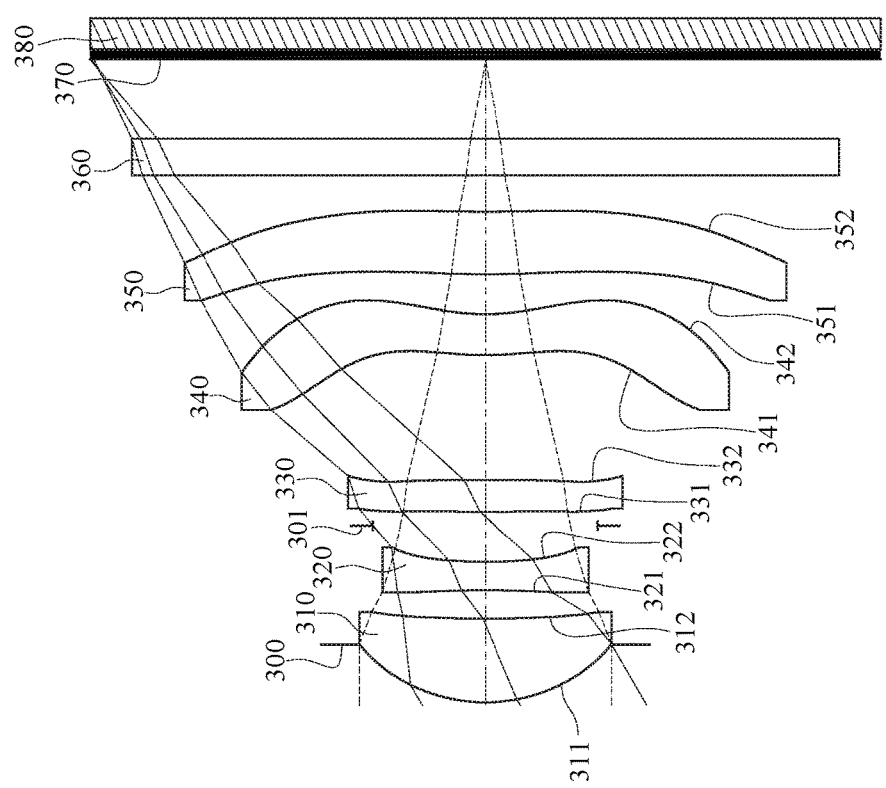
FIG. 5 is a schematic view of an image capturing unit according to the 3rd embodiment of the present disclosure.
Figure 6:
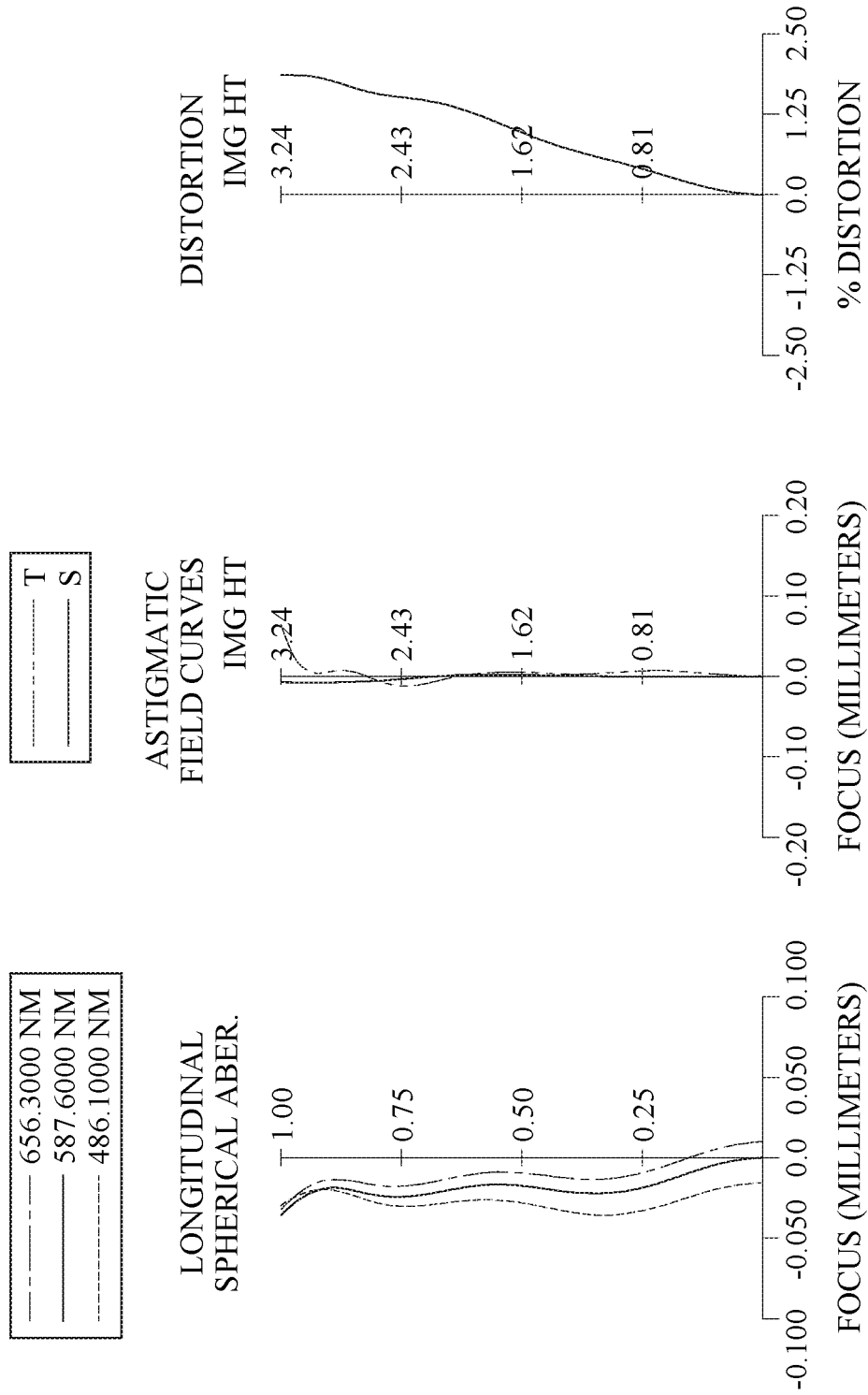
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the photographing optical lens system (its reference numeral is omitted) of the present disclosure and an image sensor 380. The photographing optical lens system includes, in order from an object side to an image side, an aperture stop 300, a first lens element 310, a second lens element 320, a stop 301, a third lens element 330, a fourth lens element 340, a fifth lens element 350, an IR-cut filter 360 and an image surface 370, wherein the photographing optical lens system has a total of five lens elements (310-350).

The first lens element 310 with positive refractive power has an object-side surface 311 being convex in a paraxial region thereof and an image-side surface 312 being concave in a paraxial region thereof. The first lens element 310 is made of plastic material and has the object-side surface 311 and the image-side surface 312 being both aspheric.

The second lens element 320 with negative refractive power has an object-side surface 321 being concave in a paraxial region thereof and an image-side surface 322 being concave in a paraxial region thereof. The second lens element 320 is made of plastic material and has the object-side surface 321 and the image-side surface 322 being both aspheric.

The third lens element 330 with positive refractive power has an object-side surface 331 being convex in a paraxial region thereof and an image-side surface 332 being concave in a paraxial region thereof. The third lens element 330 is made of plastic material and has the object-side surface 331 and the image-side surface 332 being both aspheric. Both the object-side surface 331 and the image-side surface 332 of the third lens element 330 have at least one inflection point.

The fourth lens element 340 with negative refractive power has an object-side surface 341 being convex in a paraxial region thereof and an image-side surface 342 being concave in a paraxial region thereof. The fourth lens element 340 is made of plastic material and has the object-side surface 341 and the image-side surface 342 being both aspheric. The object-side surface 341 of the fourth lens element 340 has at least one concave critical point in an off-axial region thereof. The image-side surface 342 of the fourth lens element 340 has at least one convex critical point in an off-axial region thereof.

The fifth lens element 350 with positive refractive power has an object-side surface 351 being convex in a paraxial region thereof and an image-side surface 352 being concave in a paraxial region thereof. The fifth lens element 350 is made of plastic material and has the object-side surface 351 and the image-side surface 352 being both aspheric. The image-side surface 352 of the fifth lens element 350 has at least one convex critical point in an off-axial region thereof.

The IR-cut filter 360 is made of glass material and located between the fifth lens element 350 and the image surface 370, and will not affect the focal length of the photographing optical lens system. The image sensor 380 is disposed on or near the image surface 370 of the photographing optical lens system.

The detailed optical data of the 3rd embodiment are shown in Table 5 and the aspheric surface data are shown in Table 6 below.

TABLE 5

3rd Embodiment
f = 5.50 mm, Fno = 2.65, HFOV = 30.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.474 | | | | |
| 2 | Lens 1 | 1.405 | (ASP) | 0.688 | Plastic | 1.545 | 56.1 | 2.87 |
| 3 | | 11.310 | (ASP) | 0.234 | | | | |
| 4 | Lens 2 | −7.201 | (ASP) | 0.233 | Plastic | 1.639 | 23.5 | −4.13 |
| 5 | | 4.220 | (ASP) | 0.302 | | | | |
| 6 | Stop | Plano | | 0.113 | | | | |
| 7 | Lens 3 | 9.541 | (ASP) | 0.260 | Plastic | 1.661 | 20.3 | 22.89 |
| 8 | | 25.586 | (ASP) | 1.030 | | | | |
| 9 | Lens 4 | 2.875 | (ASP) | 0.334 | Plastic | 1.544 | 56.0 | −8.31 |
| 10 | | 1.685 | (ASP) | 0.330 | | | | |
| 11 | Lens 5 | 7.791 | (ASP) | 0.519 | Plastic | 1.661 | 20.3 | 34.38 |
| 12 | | 11.546 | (ASP) | 0.300 | | | | |
| 13 | IR-cut filter | Plano | | 0.300 | Glass | 1.517 | 64.2 | — |
| 14 | | Plano | | 0.651 | | | | |
| 15 | Image | Plano | | — | | | | |

Note:
Reference wavelength is 587.6 nm (d-line).
An effective radius of the stop 301 (Surface 6) is 0.925 mm.

TABLE 6

Aspheric Coefficients

| Surface # | 2 | 3 | 4 | 5 | 7 |
|---|---|---|---|---|---|
| k = | −2.0304E−01 | 5.4386E+01 | −5.7101E+01 | −2.4084E+01 | −5.5758E+01 |
| A4 = | 1.0478E−02 | −2.4039E−02 | −1.2549E−02 | 4.9621E−02 | −1.9073E−01 |
| A6 = | 6.6188E−03 | 1.1625E−01 | 2.9212E−01 | 4.5420E−01 | 2.8478E−01 |
| A8 = | 1.2483E−02 | −1.8970E−01 | −4.8578E−01 | −1.0744E+00 | −3.3706E−01 |
| A10 = | −1.2065E−02 | 2.0179E−01 | 4.0439E−01 | 2.0228E+00 | 5.4710E−01 |
| A12 = | 1.2508E−02 | −9.1631E−02 | −1.7555E−01 | −2.1965E+00 | −4.7872E−01 |
| A14 = | — | — | — | 1.0060E+00 | 1.4821E−01 |

TABLE 6-continued

Aspheric Coefficients

| Surface # | 8 | 9 | 10 | 11 | 12 |
|---|---|---|---|---|---|
| k = | 1.4670E+01 | −7.0661E−01 | −7.3296E+00 | 4.6614E+00 | 1.5151E+01 |
| A4 = | −1.6439E−01 | −2.7477E−01 | −1.1643E−01 | −7.1343E−02 | −6.6769E−02 |
| A6 = | 2.4119E−01 | 1.1925E−01 | 2.0462E−02 | 3.6478E−02 | 1.6753E−02 |
| A8 = | −2.7153E−01 | −9.5767E−02 | 2.0076E−02 | −1.2992E−02 | 2.2925E−03 |
| A10 = | 3.8988E−01 | 6.7685E−02 | −4.7529E−03 | 2.4539E−03 | −2.7912E−03 |
| A12 = | −2.7712E−01 | −2.5468E−02 | 2.3925E−03 | −1.8914E−04 | 7.1999E−04 |
| A14 = | 6.7885E−02 | 4.8593E−03 | −5.5295E−04 | −4.3569E−06 | −8.0934E−05 |
| A16 = | — | −3.7726E−04 | 4.7600E−05 | 1.0680E−06 | 3.4695E−06 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 5.50 | T23 | 0.42 |
| Fno | 2.65 | T34 | 1.03 |
| HFOV [deg.] | 30.1 | T34/(T12 + T23 + T45) | 1.05 |
| V2 | 23.5 | T45 | 0.33 |
| V2 + V3 + V5 | 64.1 | TL/f | 0.96 |
| V3 | 20.3 | (R3 + R4)/(R3 − R4) | 0.26 |
| V3 + V5 | 40.6 | f/R9 | 0.71 |
| V4/V5 | 2.76 | f/SD52 | 2.22 |
| V5 | 20.3 | f123/f45 | −0.46 |
| CT2/T12 | 1.00 | Yc41/SD41 | 0.35 |
| T12 | 0.23 | — | — |

4th Embodiment

Figure 7:
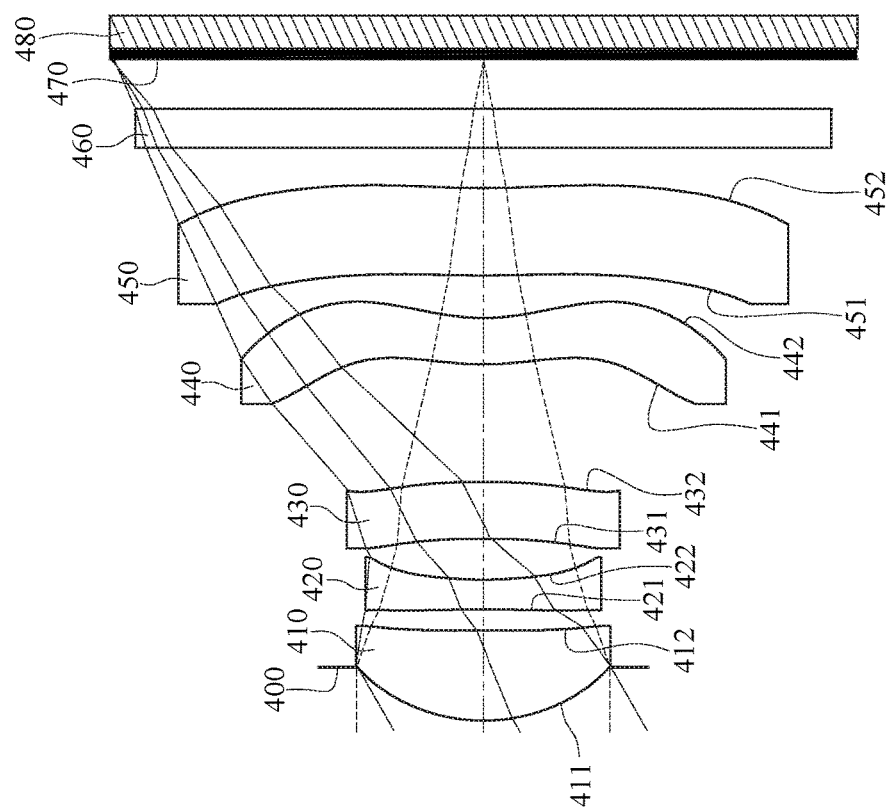
FIG. 7 is a schematic view of an image capturing unit according to the 4th embodiment of the present disclosure.
Figure 8:
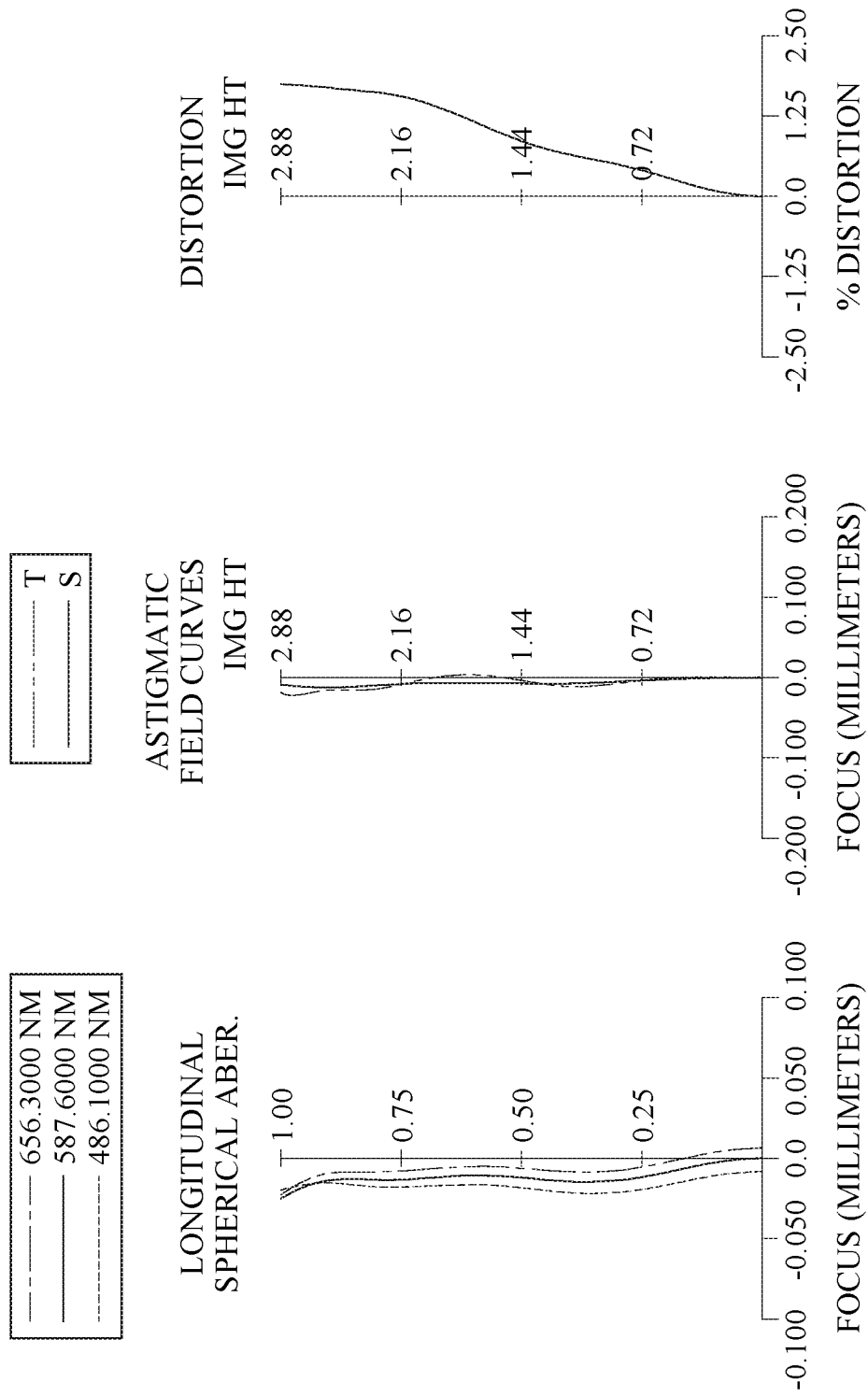
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the photographing optical lens system (its reference numeral is omitted) of the present disclosure and an image sensor 480. The photographing optical lens system includes, in order from an object side to an image side, an aperture stop 400, a first lens element 410, a second lens element 420, a third lens element 430, a fourth lens element 440, a fifth lens element 450, an IR-cut filter 460 and an image surface 470, wherein the photographing optical lens system has a total of five lens elements (410-450).

The first lens element 410 with positive refractive power has an object-side surface 411 being convex in a paraxial region thereof and an image-side surface 412 being concave in a paraxial region thereof. The first lens element 410 is made of plastic material and has the object-side surface 411 and the image-side surface 412 being both aspheric.

The second lens element 420 with negative refractive power has an object-side surface 421 being concave in a paraxial region thereof and an image-side surface 422 being concave in a paraxial region thereof. The second lens element 420 is made of plastic material and has the object-side surface 421 and the image-side surface 422 being both aspheric.

The third lens element 430 with positive refractive power has an object-side surface 431 being concave in a paraxial region thereof and an image-side surface 432 being convex in a paraxial region thereof. The third lens element 430 is made of plastic material and has the object-side surface 431 and the image-side surface 432 being both aspheric. Both the object-side surface 431 and the image-side surface 432 of the third lens element 430 have at least one inflection point.

The fourth lens element 440 with negative refractive power has an object-side surface 441 being convex in a paraxial region thereof and an image-side surface 442 being concave in a paraxial region thereof. The fourth lens element 440 is made of plastic material and has the object-side surface 441 and the image-side surface 442 being both aspheric. The object-side surface 441 of the fourth lens element 440 has at least one concave critical point in an off-axial region thereof. The image-side surface 442 of the fourth lens element 440 has at least one convex critical point in an off-axial region thereof.

The fifth lens element 450 with negative refractive power has an object-side surface 451 being convex in a paraxial region thereof and an image-side surface 452 being concave in a paraxial region thereof. The fifth lens element 450 is made of plastic material and has the object-side surface 451 and the image-side surface 452 being both aspheric. The image-side surface 452 of the fifth lens element 450 has at least one convex critical point in an off-axial region thereof.

The IR-cut filter 460 is made of glass material and located between the fifth lens element 450 and the image surface 470, and will not affect the focal length of the photographing optical lens system. The image sensor 480 is disposed on or near the image surface 470 of the photographing optical lens system.

The detailed optical data of the 4th embodiment are shown in Table 7 and the aspheric surface data are shown in Table 8 below.

TABLE 7

4th Embodiment
f = 4.96 mm, Fno = 2.53, HFOV = 29.7 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.412 | | | | |
| 2 | Lens 1 | 1.402 (ASP) | 0.696 | Plastic | 1.544 | 56.0 | 2.71 |
| 3 | | 24.259 (ASP) | 0.166 | | | | |
| 4 | Lens 2 | −10.547 (ASP) | 0.230 | Plastic | 1.639 | 23.5 | −4.33 |
| 5 | | 3.785 (ASP) | 0.319 | | | | |
| 6 | Lens 3 | −10.671 (ASP) | 0.441 | Plastic | 1.660 | 20.4 | 31.22 |
| 7 | | −7.146 (ASP) | 0.910 | | | | |
| 8 | Lens 4 | 2.331 (ASP) | 0.358 | Plastic | 1.511 | 56.8 | −12.59 |
| 9 | | 1.622 (ASP) | 0.330 | | | | |
| 10 | Lens 5 | 10.255 (ASP) | 0.680 | Plastic | 1.634 | 23.8 | −36.08 |
| 11 | | 6.898 (ASP) | 0.300 | | | | |
| 12 | IR-cut filter | Plano | 0.300 | Glass | 1.517 | 64.2 | — |
| 13 | | Plano | 0.395 | | | | |
| 14 | Image | Plano | — | | | | |

Note:
Reference wavelength is 587.6 nm (d-line).

TABLE 8

Aspheric Coefficients

| Surface # | 2 | 3 | 4 | 5 | 6 |
|---|---|---|---|---|---|
| k = | −2.8184E−01 | −2.7138E+00 | −2.2479E+01 | −2.6188E+01 | −9.8717E+01 |
| A4 = | 1.5281E−02 | −4.5359E−03 | −1.3529E−01 | 1.8576E−02 | −1.9449E−01 |
| A6 = | 1.2608E−02 | 1.1412E−01 | 3.0782E−01 | 4.4199E−01 | 2.1488E−01 |
| A8 = | 4.6637E−03 | −1.6185E−01 | −4.8050E−01 | −1.0423E+00 | −2.4302E−01 |
| A10 = | 1.8625E−03 | 1.6162E−01 | 3.7556E−01 | 2.0149E+00 | 5.1504E−01 |
| A12 = | 6.0768E−03 | −8.8849E−02 | −1.7600E−01 | −2.1965E+00 | −4.7873E−01 |
| A14 = | — | — | — | 1.0058E+00 | 1.4812E−01 |

| Surface # | 7 | 8 | 9 | 10 | 11 |
|---|---|---|---|---|---|
| k = | −4.1364E+00 | −4.8489E−01 | −5.9642E+00 | 1.9749E+01 | −4.2111E+00 |
| A4 = | −1.3506E−01 | −2.7214E−01 | −1.1940E−01 | −8.0011E−02 | −6.7118E−02 |
| A6 = | 2.1242E−01 | 1.0681E−01 | 1.4339E−02 | 3.9405E−02 | 1.6197E−02 |
| A8 = | −2.9779E−01 | −9.2219E−02 | 4.2527E−03 | −1.3390E−02 | 2.7224E−03 |
| A10 = | 4.2542E−01 | 6.8225E−02 | −4.6502E−03 | 2.4676E−03 | −2.8144E−03 |
| A12 = | −2.7753E−01 | −2.5619E−02 | 2.3102E−03 | −1.8561E−04 | 7.1185E−04 |
| A14 = | 6.6702E−02 | 4.7995E−03 | −5.6383E−04 | −7.1614E−06 | −8.1063E−05 |
| A16 = | — | −3.6486E−04 | 5.0744E−05 | 1.1788E−06 | 3.5901E−06 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 4.96 | T23 | 0.32 |
| Fno | 2.53 | T34 | 0.91 |
| HFOV [deg.] | 29.7 | T34/(T12 + T23 + T45) | 1.12 |
| V2 | 23.5 | T45 | 0.33 |
| V2 + V3 + V5 | 67.7 | TL/f | 1.03 |
| V3 | 20.4 | (R3 + R4)/(R3 − R4) | 0.47 |
| V3 + V5 | 44.2 | f/R9 | 0.48 |
| V4/V5 | 2.39 | f/SD52 | 2.10 |

-continued

| 4th Embodiment | | | |
|---|---|---|---|
| V5 | 23.8 | f123/f45 | −0.50 |
| CT2/T12 | 1.39 | Yc41/SD41 | 0.43 |
| T12 | 0.17 | — | — |

5th Embodiment

Figure 9:
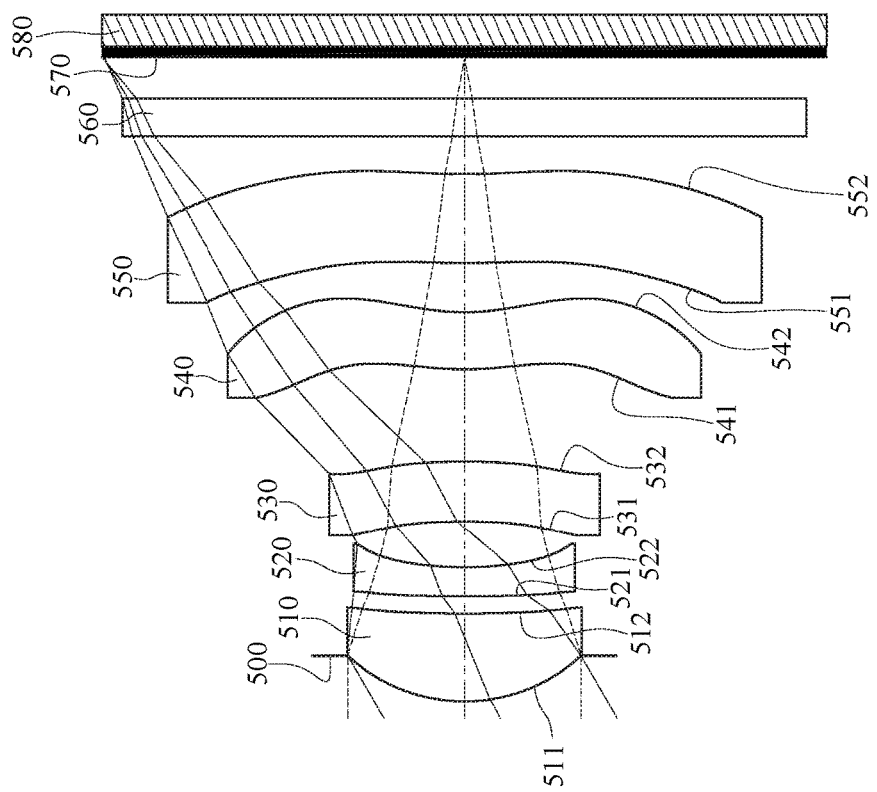
FIG. 9 is a schematic view of an image capturing unit according to the 5th embodiment of the present disclosure.
Figure 10:
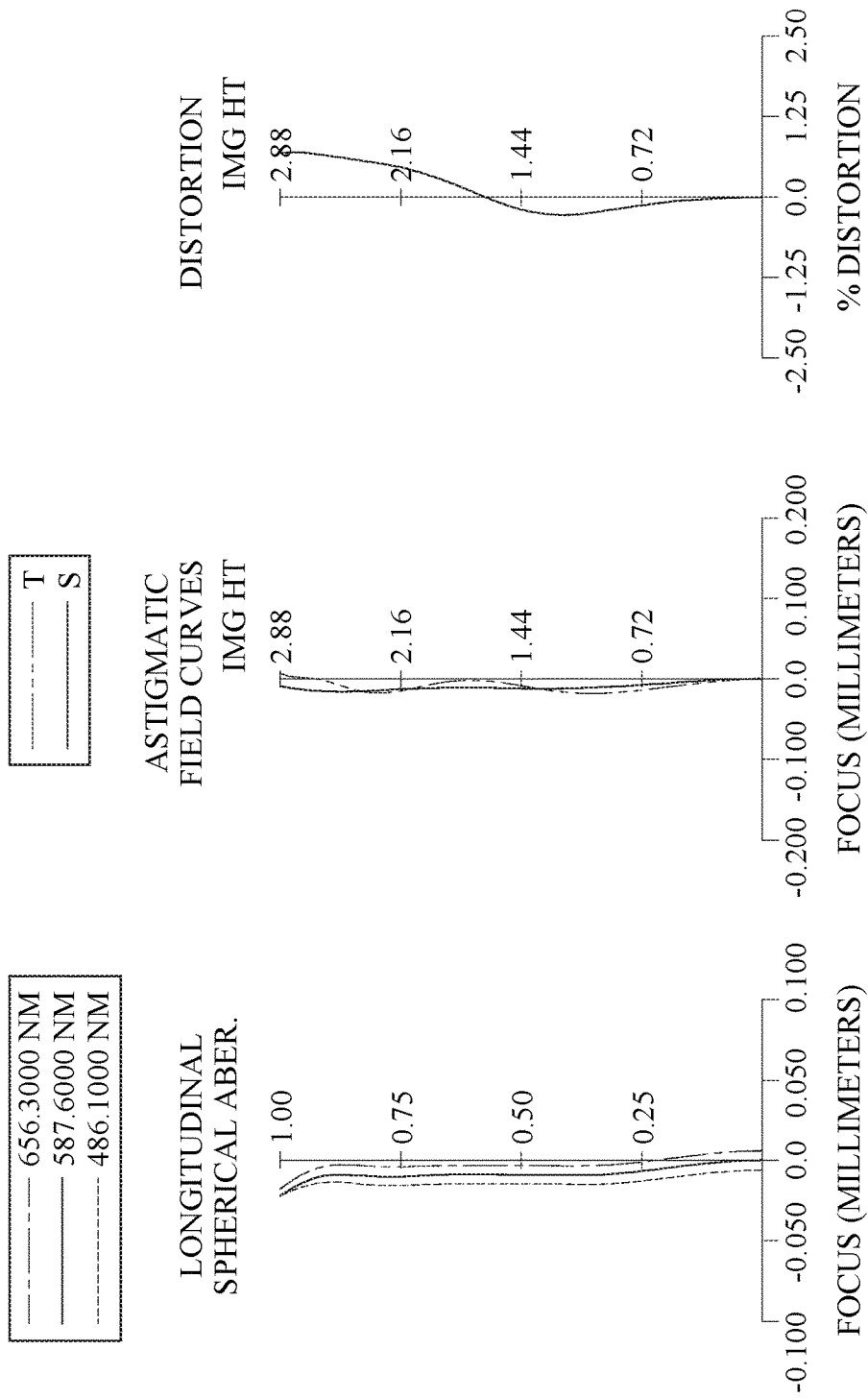
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the photographing optical lens system (its reference numeral is omitted) of the present disclosure and an image sensor 580. The photographing optical lens system includes, in order from an object side to an image side, an aperture stop 500, a first lens element 510, a second lens element 520, a third lens element 530, a fourth lens element 540, a fifth lens element 550, an IR-cut filter 560 and an image surface 570, wherein the photographing optical lens system has a total of five lens elements (510-550).

The first lens element 510 with positive refractive power has an object-side surface 511 being convex in a paraxial region thereof and an image-side surface 512 being concave in a paraxial region thereof. The first lens element 510 is made of plastic material and has the object-side surface 511 and the image-side surface 512 being both aspheric.

The second lens element 520 with negative refractive power has an object-side surface 521 being convex in a paraxial region thereof and an image-side surface 522 being concave in a paraxial region thereof. The second lens element 520 is made of plastic material and has the object-side surface 521 and the image-side surface 522 being both aspheric.

The third lens element 530 with negative refractive power has an object-side surface 531 being concave in a paraxial region thereof and an image-side surface 532 being convex in a paraxial region thereof. The third lens element 530 is made of plastic material and has the object-side surface 531 and the image-side surface 532 being both aspheric. Both the object-side surface 531 and the image-side surface 532 of the third lens element 530 have at least one inflection point.

The fourth lens element 540 with negative refractive power has an object-side surface 541 being convex in a paraxial region thereof and an image-side surface 542 being concave in a paraxial region thereof. The fourth lens element 540 is made of plastic material and has the object-side surface 541 and the image-side surface 542 being both aspheric. The object-side surface 541 of the fourth lens element 540 has at least one concave critical point in an off-axial region thereof. The image-side surface 542 of the fourth lens element 540 has at least one convex critical point in an off-axial region thereof.

The fifth lens element 550 with negative refractive power has an object-side surface 551 being convex in a paraxial region thereof and an image-side surface 552 being concave in a paraxial region thereof. The fifth lens element 550 is made of plastic material and has the object-side surface 551 and the image-side surface 552 being both aspheric. The image-side surface 552 of the fifth lens element 550 has at least one convex critical point in an off-axial region thereof.

The IR-cut filter 560 is made of glass material and located between the fifth lens element 550 and the image surface 570, and will not affect the focal length of the photographing optical lens system. The image sensor 580 is disposed on or near the image surface 570 of the photographing optical lens system.

The detailed optical data of the 5th embodiment are shown in Table 9 and the aspheric surface data are shown in Table 10 below.

TABLE 9

5th Embodiment
f = 4.94 mm, Fno = 2.66, HFOV = 30.1 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.364 | | | | |
| 2 | Lens 1 | 1.385 (ASP) | 0.700 | Plastic | 1.544 | 56.0 | 2.79 |
| 3 | | 12.839 (ASP) | 0.138 | | | | |
| 4 | Lens 2 | 17.448 (ASP) | 0.230 | Plastic | 1.642 | 22.5 | −5.30 |
| 5 | | 2.833 (ASP) | 0.367 | | | | |
| 6 | Lens 3 | −5.653 (ASP) | 0.478 | Plastic | 1.660 | 20.4 | −280.78 |
| 7 | | −6.027 (ASP) | 0.735 | | | | |
| 8 | Lens 4 | 2.552 (ASP) | 0.454 | Plastic | 1.511 | 56.8 | −14.16 |
| 9 | | 1.773 (ASP) | 0.392 | | | | |
| 10 | Lens 5 | 8.391 (ASP) | 0.712 | Plastic | 1.639 | 23.3 | −25.80 |
| 11 | | 5.376 (ASP) | 0.300 | | | | |
| 12 | IR-cut filter | Plano | 0.300 | Glass | 1.517 | 64.2 | — |
| 13 | | Plano | 0.331 | | | | |
| 14 | Image | Plano | — | | | | |

Note:
Reference wavelength is 587.6 nm (d-line).

TABLE 10

Aspheric Coefficients

| Surface # | 2 | 3 | 4 | 5 | 6 |
|---|---|---|---|---|---|
| k = | −4.8992E−01 | −3.4402E+01 | −7.6086E+01 | −1.1262E+01 | −5.1435E+01 |
| A4 = | 2.4596E−02 | −1.7225E−03 | −4.1293E−02 | 6.6713E−03 | −2.0423E−01 |
| A6 = | 2.0123E−02 | 1.0770E−01 | 3.0658E−02 | 4.1832E−01 | 1.7849E−01 |
| A8 = | −4.5871E−03 | −1.5384E−01 | −4.6499E−01 | −1.0017E+00 | −2.1913E−01 |
| A10 = | 1.4505E−02 | 1.5279E−01 | 4.1803E−01 | 2.0300E+00 | 5.1377E−01 |
| A12 = | −1.9147E−03 | −9.6891E−02 | −2.3246E−01 | −2.1965E+00 | −4.7872E−01 |
| A14 = | — | — | — | 1.0060E+00 | 1.4821E−01 |

| Surface # | 7 | 8 | 9 | 10 | 11 |
|---|---|---|---|---|---|
| k = | 1.0899E+01 | 1.2481E−01 | −7.8553E+00 | −9.9871E+01 | −5.4624E+01 |
| A4 = | −1.4029E−01 | −2.6037E−01 | −1.0742E−01 | −9.9579E−02 | −6.7912E−02 |

TABLE 10-continued

| Aspheric Coefficients | | | | | |
|---|---|---|---|---|---|
| A6 =  | 2.2038E−01  | 1.1010E−01  | 9.7588E−03  | 4.6666E−02  | 1.5948E−02 |
| A8 =  | −3.0600E−01 | −9.0493E−02 | 6.0292E−03  | −1.3530E−02 | 3.0632E−03 |
| A10 = | 4.1052E−01  | 6.7109E−02  | −4.7586E−03 | 2.4387E−03  | −2.8415E−03 |
| A12 = | −2.4813E−01 | −2.5802E−02 | 2.2290E−03  | −2.0141E−04 | 7.0872E−04 |
| A14 = | 5.3857E−02  | 4.8900E−03  | −5.5885E−04 | −9.7550E−06 | −8.0809E−05 |
| A16 = | —           | −3.6962E−04 | 5.2124E−05  | 2.0648E−06  | 3.5994E−06 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm]     | 4.94 | T23                | 0.37 |
| Fno        | 2.66 | T34                | 0.74 |
| HFOV [deg.]| 30.1 | T34/(T12 + T23 + T45) | 0.82 |
| V2         | 22.5 | T45                | 0.39 |
| V2 + V3 + V5 | 66.2 | TL/f             | 1.04 |
| V3         | 20.4 | (R3 + R4)/(R3 − R4) | 1.39 |
| V3 + V5    | 43.7 | f/R9               | 0.59 |
| V4/V5      | 2.44 | f/SD52             | 2.09 |
| V5         | 23.3 | f123/f45           | −0.52 |
| CT2/T12    | 1.67 | Yc41/SD41          | 0.42 |
| T12        | 0.14 | —                  | —    |

6th Embodiment

Figure 11:
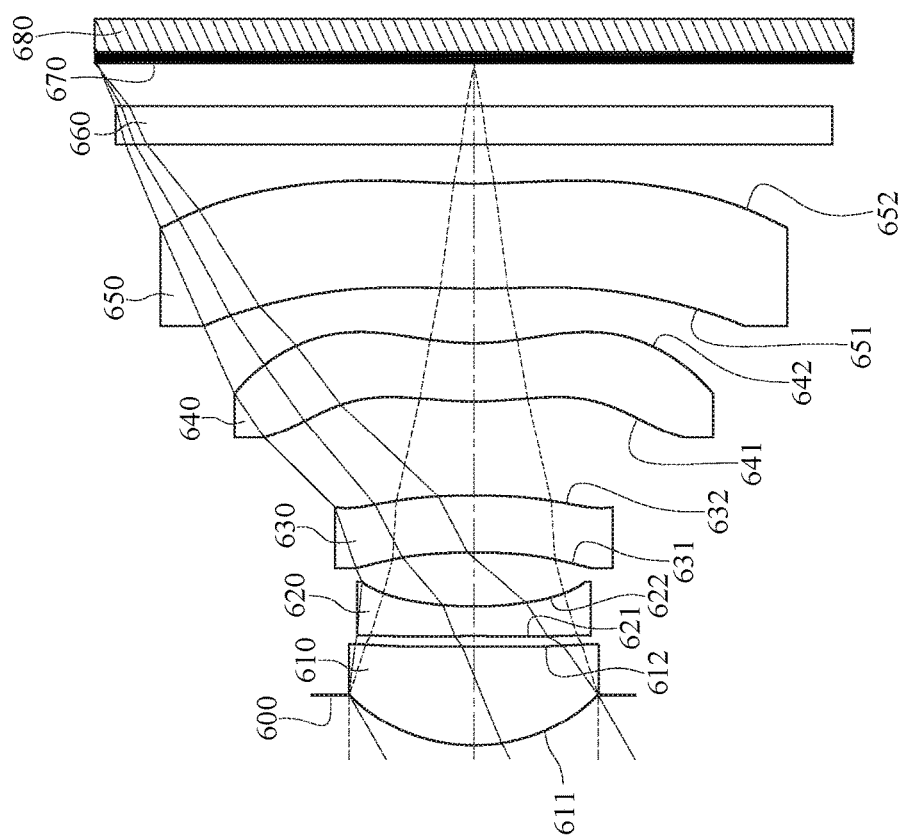
FIG. 11 is a schematic view of an image capturing unit according to the 6th embodiment of the present disclosure.
Figure 12:
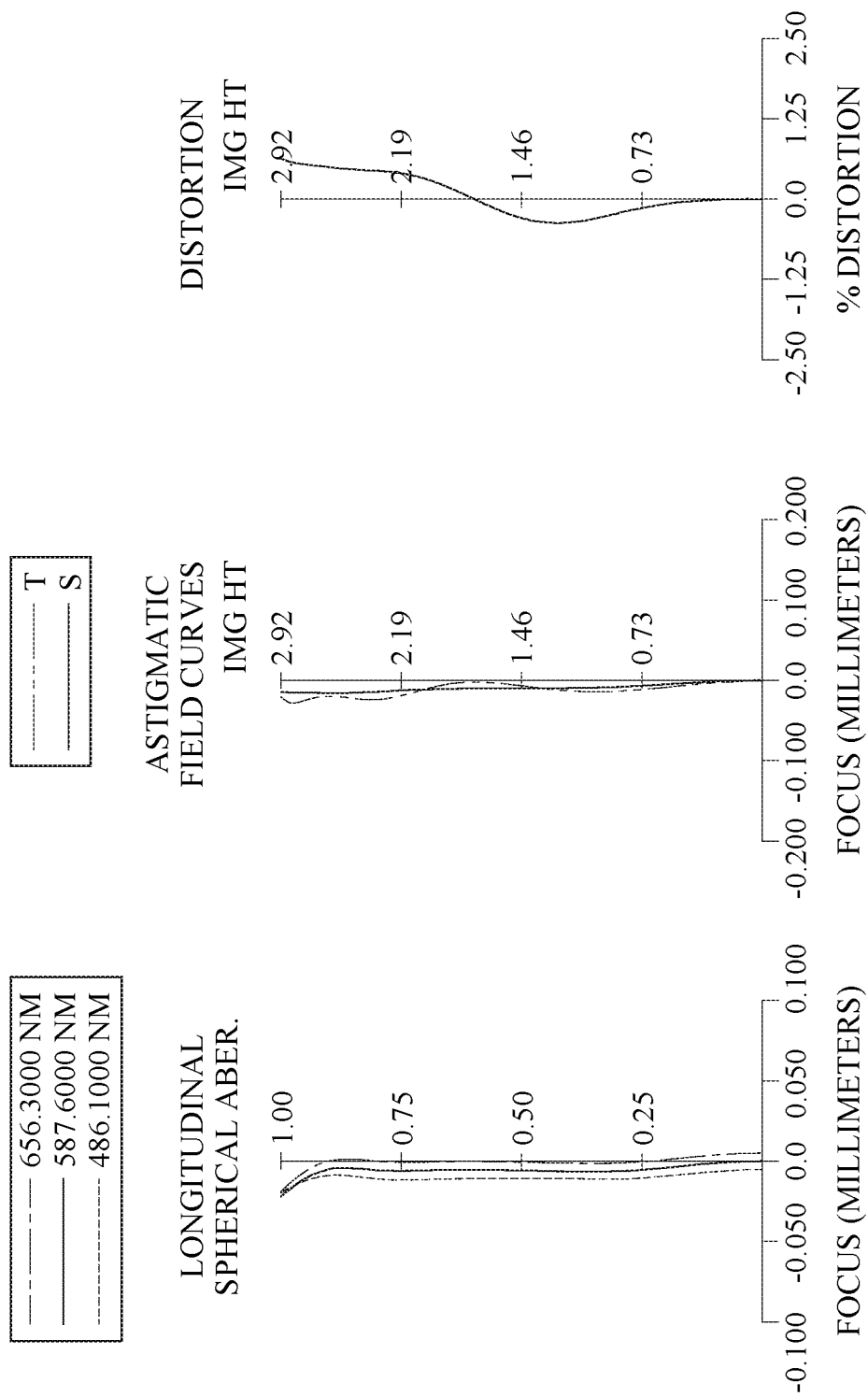
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the photographing optical lens system (its reference numeral is omitted) of the present disclosure and an image sensor 680. The photographing optical lens system includes, in order from an object side to an image side, an aperture stop 600, a first lens element 610, a second lens element 620, a third lens element 630, a fourth lens element 640, a fifth lens element 650, an IR-cut filter 660 and an image surface 670, wherein the photographing optical lens system has a total of five lens elements (610-650).

The first lens element 610 with positive refractive power has an object-side surface 611 being convex in a paraxial region thereof and an image-side surface 612 being convex in a paraxial region thereof. The first lens element 610 is made of plastic material and has the object-side surface 611 and the image-side surface 612 being both aspheric.

The second lens element 620 with negative refractive power has an object-side surface 621 being concave in a paraxial region thereof and an image-side surface 622 being concave in a paraxial region thereof. The second lens element 620 is made of plastic material and has the object-side surface 621 and the image-side surface 622 being both aspheric.

The third lens element 630 with negative refractive power has an object-side surface 631 being concave in a paraxial region thereof and an image-side surface 632 being convex in a paraxial region thereof. The third lens element 630 is made of plastic material and has the object-side surface 631 and the image-side surface 632 being both aspheric. Both the object-side surface 631 and the image-side surface 632 of the third lens element 630 have at least one inflection point.

The fourth lens element 640 with negative refractive power has an object-side surface 641 being convex in a paraxial region thereof and an image-side surface 642 being concave in a paraxial region thereof. The fourth lens element 640 is made of plastic material and has the object-side surface 641 and the image-side surface 642 being both aspheric. The object-side surface 641 of the fourth lens element 640 has at least one concave critical point in an off-axial region thereof. The image-side surface 642 of the fourth lens element 640 has at least one convex critical point in an off-axial region thereof.

The fifth lens element 650 with negative refractive power has an object-side surface 651 being convex in a paraxial region thereof and an image-side surface 652 being concave in a paraxial region thereof. The fifth lens element 650 is made of plastic material and has the object-side surface 651 and the image-side surface 652 being both aspheric. The image-side surface 652 of the fifth lens element 650 has at least one convex critical point in an off-axial region thereof.

The IR-cut filter 660 is made of glass material and located between the fifth lens element 650 and the image surface 670, and will not affect the focal length of the photographing optical lens system. The image sensor 680 is disposed on or near the image surface 670 of the photographing optical lens system.

The detailed optical data of the 6th embodiment are shown in Table 11 and the aspheric surface data are shown in Table 12 below.

TABLE 11

6th Embodiment
f = 5.12 mm, Fno = 2.66, HFOV = 29.6 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.392 | | | | |
| 2 | Lens 1 | 1.400 (ASP) | 0.768 | Plastic | 1.544 | 55.9 | 2.55 |
| 3 | | −134.354 (ASP) | 0.079 | | | | |
| 4 | Lens 2 | −42.958 (ASP) | 0.230 | Plastic | 1.614 | 26.0 | −4.26 |
| 5 | | 2.789 (ASP) | 0.417 | | | | |
| 6 | Lens 3 | −5.456 (ASP) | 0.440 | Plastic | 1.671 | 19.5 | −92.92 |
| 7 | | −6.173 (ASP) | 0.730 | | | | |
| 8 | Lens 4 | 2.814 (ASP) | 0.450 | Plastic | 1.511 | 56.8 | −14.16 |
| 9 | | 1.916 (ASP) | 0.423 | | | | |
| 10 | Lens 5 | 9.382 (ASP) | 0.810 | Plastic | 1.614 | 26.0 | −31.68 |
| 11 | | 6.121 (ASP) | 0.300 | | | | |
| 12 | IR-cut filter | Plano | 0.300 | Glass | 1.517 | 64.2 | — |
| 13 | | Plano | 0.337 | | | | |
| 14 | Image | Plano | — | | | | |

Note:
Reference wavelength is 587.6 nm (d-line).

TABLE 12

Aspheric Coefficients

| Surface # | 2 | 3 | 4 | 5 | 6 |
|---|---|---|---|---|---|
| k = | −2.7646E−01 | −9.9000E+01 | −9.0014E+01 | −9.8510E+00 | −4.7370E+01 |
| A4 = | 1.5721E−02 | 5.8999E−03 | −3.9641E−01 | 2.8832E−03 | −2.0451E−01 |
| A6 = | 1.5042E−02 | 1.1502E−01 | 3.0801E−01 | 3.9615E−01 | 1.8247E−01 |
| A8 = | −5.5501E−03 | −1.4808E−01 | −4.7782E−01 | −1.0076E+00 | −2.3020E−01 |
| A10 = | 1.4527E−02 | 1.3306E−01 | 4.2875E−01 | 2.0395E+00 | 5.1184E−01 |
| A12 = | −2.1328E−03 | −1.0092E−01 | −2.3855E−01 | −2.1965E+00 | −4.7872E−01 |
| A14 = | — | — | — | 1.0060E+00 | 1.4821E−01 |

| Surface # | 7 | 8 | 9 | 10 | 11 |
|---|---|---|---|---|---|
| k = | 1.3885E+01 | 1.2999E−01 | −9.4883E+00 | 9.4037E+00 | −3.8168E+01 |
| A4 = | −1.4213E−01 | −2.7016E−01 | −1.1916E−01 | −1.0175E−01 | −6.5114E−02 |
| A6 = | 2.1966E−01 | 1.1158E−01 | 1.2467E−02 | 4.5359E−02 | 1.5908E−02 |
| A8 = | −2.9683E−01 | −8.9483E−02 | 6.0514E−03 | −1.3479E−02 | 2.9121E−03 |
| A10 = | 4.1033E−01 | 6.7144E−02 | −4.8221E−03 | 2.4450E−03 | −2.8334E−03 |
| A12 = | −2.5631E−01 | −2.5716E−02 | 2.2228E−03 | −1.9832E−04 | 7.0925E−04 |
| A14 = | 5.9349E−02 | 4.8620E−03 | −5.6470E−04 | −9.5219E−06 | −8.0659E−05 |
| A16 = | — | −3.7212E−04 | 5.4197E−05 | 2.1277E−06 | 3.5889E−06 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 5.12 | T23 | 0.42 |
| Fno | 2.66 | T34 | 0.73 |
| HFOV [deg.] | 29.6 | T34/(T12 + T23 + T45) | 0.79 |
| V2 | 26.0 | T45 | 0.42 |
| V2 + V3 + V5 | 71.5 | TL/f | 1.03 |
| V3 | 19.5 | (R3 + R4)/(R3 − R4) | 0.88 |
| V3 + V5 | 45.5 | f/R9 | 0.55 |
| V4/V5 | 2.18 | f/SD52 | 2.11 |
| V5 | 26.0 | f123/f45 | −0.50 |
| CT2/T12 | 2.91 | Yc41/SD41 | 0.40 |
| T12 | 0.08 | — | — |

7th Embodiment

Figure 13:
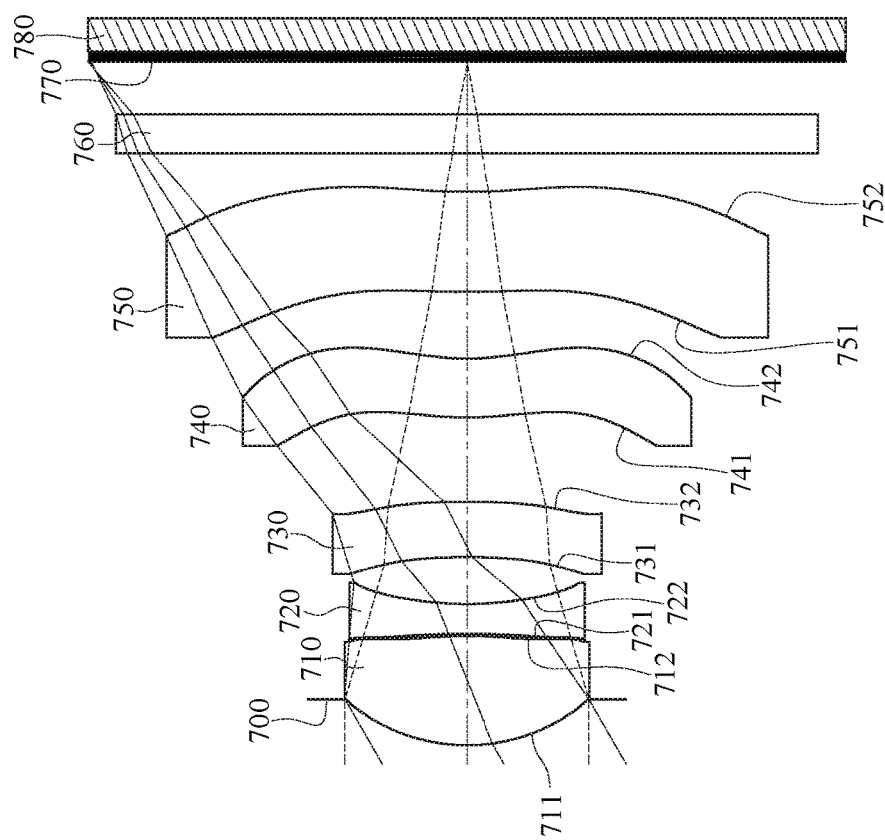
FIG. 13 a schematic view of an image capturing unit according to the 7th embodiment of the present disclosure.
Figure 14:
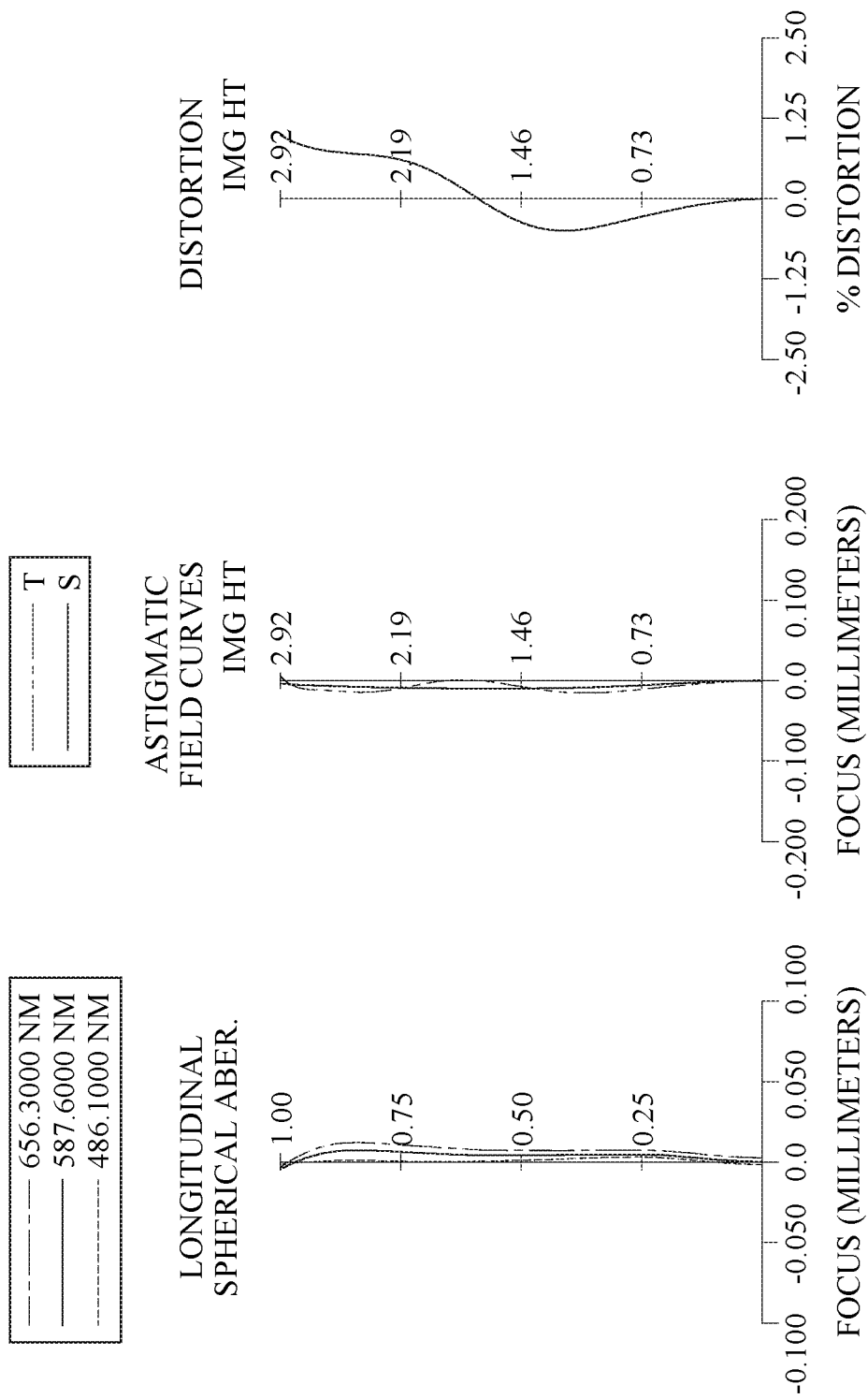
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the photographing optical lens system (its reference numeral is omitted) of the present disclosure and an image sensor 780. The photographing optical lens system includes, in order from an object side to an image side, an aperture stop 700, a first lens element 710, a second lens element 720, a third lens element 730, a fourth lens element 740, a fifth lens element 750, an IR-cut filter 760 and an image surface 770, wherein the photographing optical lens system has a total of five lens elements (710-750).

The first lens element 710 with positive refractive power has an object-side surface 711 being convex in a paraxial region thereof and an image-side surface 712 being convex in a paraxial region thereof. The first lens element 710 is made of plastic material and has the object-side surface 711 and the image-side surface 712 being both aspheric.

The second lens element 720 with negative refractive power has an object-side surface 721 being concave in a paraxial region thereof and an image-side surface 722 being concave in a paraxial region thereof. The second lens element 720 is made of plastic material and has the object-side surface 721 and the image-side surface 722 being both aspheric. The object-side surface 721 of the second lens element 720 is cemented to the image-side surface 712 of the first lens element 710.

The third lens element 730 with negative refractive power has an object-side surface 731 being concave in a paraxial region thereof and an image-side surface 732 being convex in a paraxial region thereof. The third lens element 730 is made of plastic material and has the object-side surface 731 and the image-side surface 732 being both aspheric. The image-side surface 732 of the third lens element 730 has at least one inflection point.

The fourth lens element 740 with negative refractive power has an object-side surface 741 being convex in a paraxial region thereof and an image-side surface 742 being concave in a paraxial region thereof. The fourth lens element 740 is made of plastic material and has the object-side surface 741 and the image-side surface 742 being both aspheric. The object-side surface 741 of the fourth lens element 740 has at least one concave critical point in an off-axial region thereof. The image-side surface 742 of the fourth lens element 740 has at least one convex critical point in an off-axial region thereof.

The fifth lens element 750 with negative refractive power has an object-side surface 751 being convex in a paraxial region thereof and an image-side surface 752 being concave in a paraxial region thereof. The fifth lens element 750 is made of plastic material and has the object-side surface 751 and the image-side surface 752 being both aspheric. The image-side surface 752 of the fifth lens element 750 has at least one convex critical point in an off-axial region thereof.

The IR-cut filter 760 is made of glass material and located between the fifth lens element 750 and the image surface 770, and will not affect the focal length of the photographing optical lens system. The image sensor 780 is disposed on or near the image surface 770 of the photographing optical lens system.

The detailed optical data of the 7th embodiment are shown in Table 13 and the aspheric surface data are shown in Table 14 below.

TABLE 13

7th Embodiment
$f = 5.02$ mm, Fno = 2.66, HFOV = 29.9 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.355 | | | | |
| 2 | Lens 1 | 1.449 (ASP) | 0.845 | Plastic | 1.544 | 55.9 | 1.87 |
| 3 | | −2.707 (ASP) | 0.018 | Cement | 1.485 | 53.2 | |
| 4 | Lens 2 | −6.479 (ASP) | 0.230 | Plastic | 1.582 | 30.2 | −3.25 |
| 5 | | 2.709 (ASP) | 0.366 | | | | |
| 6 | Lens 3 | −5.798 (ASP) | 0.430 | Plastic | 1.671 | 19.5 | −63.61 |
| 7 | | −6.910 (ASP) | 0.651 | | | | |
| 8 | Lens 4 | 2.622 (ASP) | 0.455 | Plastic | 1.511 | 56.8 | −20.33 |
| 9 | | 1.971 (ASP) | 0.515 | | | | |
| 10 | Lens 5 | 6.463 (ASP) | 0.779 | Plastic | 1.614 | 26.0 | −19.34 |
| 11 | | 3.993 (ASP) | 0.300 | | | | |
| 12 | IR-cut filter | Plano | 0.300 | Glass | 1.517 | 64.2 | — |
| 13 | | Plano | 0.403 | | | | |
| 14 | Image | Plano | — | | | | |

Note:
Reference wavelength is 587.6 nm (d-line).

TABLE 14

| Aspheric Coefficients | | | | | |
|---|---|---|---|---|---|
| Surface # | 2 | 3 | 4 | 5 | 6 |
| k = | −2.9433E−01 | −9.0534E+01 | 2.3166E+01 | −9.4915E+00 | −5.8230E+01 |
| A4 = | 1.5106E−02 | 9.1438E−02 | −3.4179E−02 | −2.0307E−02 | −2.0200E−01 |
| A6 = | 1.5470E−02 | 1.5817E−01 | 3.4681E−01 | 3.1663E−01 | 1.5121E−01 |
| A8 = | −9.4478E−03 | −2.1080E−01 | −4.9982E−01 | −9.8006E−01 | −2.6808E−01 |
| A10 = | 1.3247E−02 | −3.9638E−03 | 4.4478E−01 | 2.0539E+00 | 5.4610E−01 |
| A12 = | −2.7672E−03 | −8.3343E−02 | −2.4355E−01 | −2.1975E+00 | −4.7818E−01 |
| A14 = | — | — | — | 1.0040E+00 | 1.4918E−01 |

TABLE 14-continued

| Aspheric Coefficients | | | | | |
|---|---|---|---|---|---|
| Surface # | 7 | 8 | 9 | 10 | 11 |
| k = | 2.0493E+01 | −2.7739E−01 | −1.0645E+01 | −9.7068E+01 | −3.9642E+01 |
| A4 = | −1.4671E−01 | −2.5816E−01 | −1.1141E−01 | −1.1125E−01 | −6.7669E−02 |
| A6 = | 2.1133E−01 | 1.1067E−01 | 1.0977E−02 | 4.7821E−02 | 1.4590E−02 |
| A8 = | −2.9743E−01 | −9.0959E−02 | 5.7477E−03 | −1.4081E−02 | 3.2254E−03 |
| A10 = | 4.0829E−01 | 6.6713E−02 | −4.7957E−03 | 2.5236E−03 | −2.8320E−03 |
| A12 = | −2.5007E−01 | −2.6111E−02 | 2.2129E−03 | −1.8077E−04 | 7.0284E−04 |
| A14 = | 6.1296E−02 | 4.8436E−03 | −5.7293E−04 | −8.2273E−06 | −8.0431E−05 |
| A16 = | — | −2.8553E−04 | 5.4657E−05 | 1.5905E−06 | 3.6731E−06 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 5.02 | T23 | 0.37 |
| Fno | 2.66 | T34 | 0.65 |
| HFOV [deg.] | 29.9 | T34/(T12 + T23 + T45) | 0.72 |
| V2 | 30.2 | T45 | 0.52 |
| V2 + V3 + V5 | 75.7 | TL/f | 1.05 |
| V3 | 19.5 | (R3 + R4)/(R3 − R4) | 0.41 |
| V3 + V5 | 45.5 | f/R9 | 0.78 |
| V4/V5 | 2.18 | f/SD52 | 2.16 |
| V5 | 26.0 | f123/f45 | −0.50 |
| CT2/T12 | 12.78 | Yc41/SD41 | 0.47 |
| T12 | 0.02 | — | — |

8th Embodiment

Figure 15:
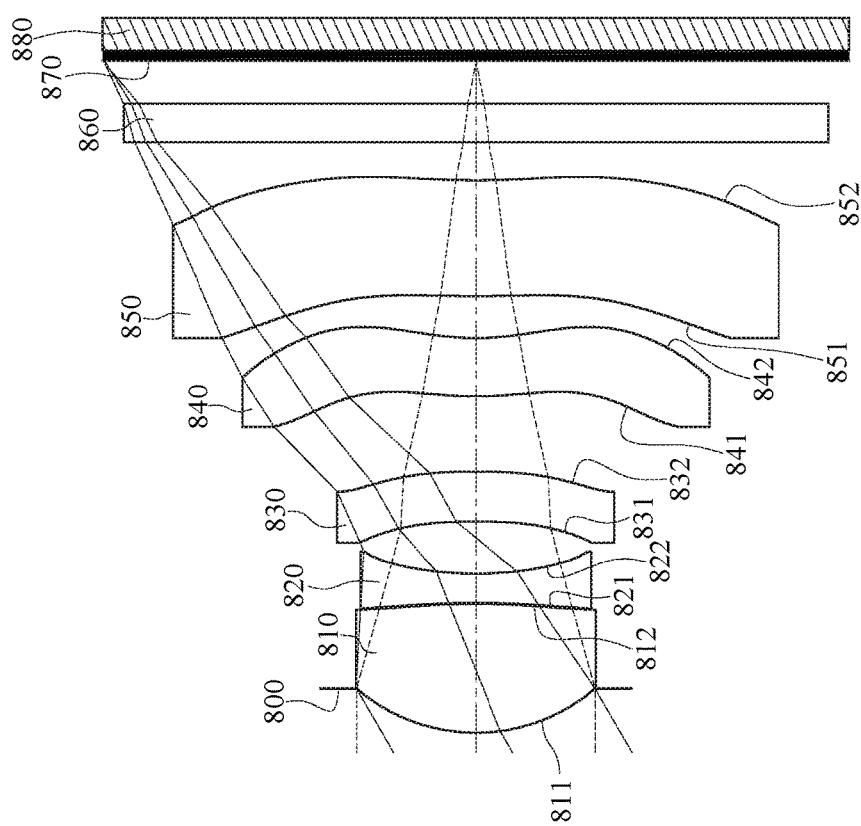
FIG. 15 a schematic view of an image capturing unit according to the 8th embodiment of the present disclosure.
Figure 16:
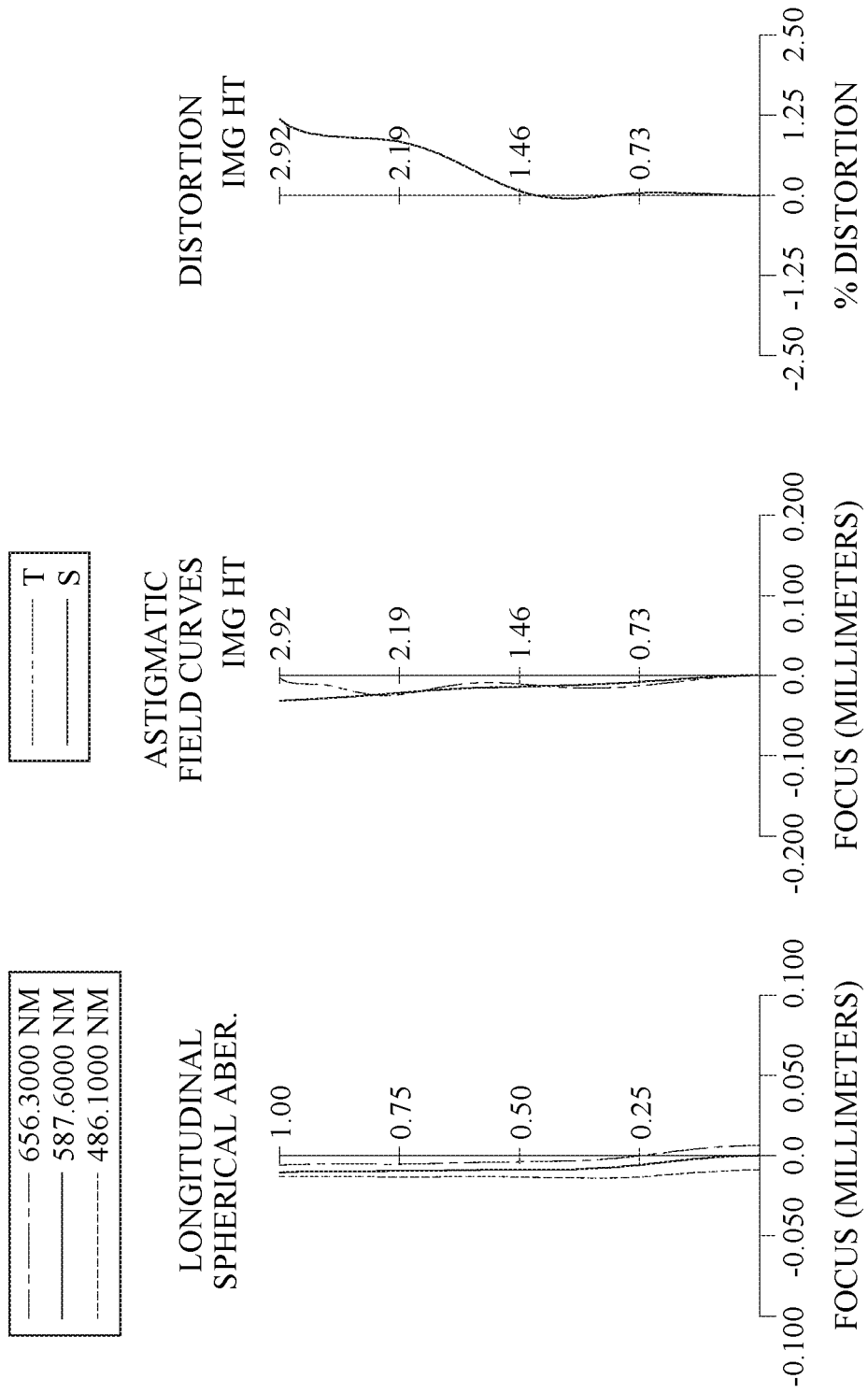
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit includes the photographing optical lens system (its reference numeral is omitted) of the present disclosure and an image sensor 880. The photographing optical lens system includes, in order from an object side to an image side, an aperture stop 800, a first lens element 810, a second lens element 820, a third lens element 830, a fourth lens element 840, a fifth lens element 850, an IR-cut filter 860 and an image surface 870, wherein the photographing optical lens system has a total of five lens elements (810-850).

The first lens element 810 with positive refractive power has an object-side surface 811 being convex in a paraxial region thereof and an image-side surface 812 being convex in a paraxial region thereof. The first lens element 810 is made of plastic material and has the object-side surface 811 and the image-side surface 812 being both aspheric.

The second lens element 820 with negative refractive power has an object-side surface 821 being concave in a paraxial region thereof and an image-side surface 822 being concave in a paraxial region thereof. The second lens element 820 is made of plastic material and has the object-side surface 821 and the image-side surface 822 being both aspheric. The object-side surface 821 of the second lens element 820 is cemented to the image-side surface 812 of the first lens element 810.

The third lens element 830 with negative refractive power has an object-side surface 831 being concave in a paraxial region thereof and an image-side surface 832 being convex in a paraxial region thereof. The third lens element 830 is made of plastic material and has the object-side surface 831 and the image-side surface 832 being both aspheric. The image-side surface 832 of the third lens element 830 has at least one inflection point.

The fourth lens element 840 with negative refractive power has an object-side surface 841 being convex in a paraxial region thereof and an image-side surface 842 being concave in a paraxial region thereof. The fourth lens element 840 is made of plastic material and has the object-side surface 841 and the image-side surface 842 being both aspheric. The object-side surface 841 of the fourth lens element 840 has at least one concave critical point in an off-axial region thereof. The image-side surface 842 of the fourth lens element 840 has at least one convex critical point in an off-axial region thereof.

The fifth lens element 850 with negative refractive power has an object-side surface 851 being convex in a paraxial region thereof and an image-side surface 852 being concave in a paraxial region thereof. The fifth lens element 850 is made of plastic material and has the object-side surface 851 and the image-side surface 852 being both aspheric. The image-side surface 852 of the fifth lens element 850 has at least one convex critical point in an off-axial region thereof.

The IR-cut filter 860 is made of glass material and located between the fifth lens element 850 and the image surface 870, and will not affect the focal length of the photographing optical lens system. The image sensor 880 is disposed on or near the image surface 870 of the photographing optical lens system.

The detailed optical data of the 8th embodiment are shown in Table 15 and the aspheric surface data are shown in Table 16 below.

TABLE 15

8th Embodiment
f = 4.99 mm, Fno = 2.66, HFOV = 30.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.345 | | | | |
| 2 | Lens 1 | 1.445 | (ASP) | 1.010 | Plastic | 1.534 | 55.9 | 2.41 |
| 3 | | −8.763 | (ASP) | 0.010 | Cement | 1.485 | 53.2 | |
| 4 | Lens 2 | −8.763 | (ASP) | 0.230 | Plastic | 1.584 | 28.2 | −3.73 |
| 5 | | 2.931 | (ASP) | 0.414 | | | | |
| 6 | Lens 3 | −4.610 | (ASP) | 0.393 | Plastic | 1.671 | 19.5 | −131.11 |
| 7 | | −5.031 | (ASP) | 0.590 | | | | |
| 8 | Lens 4 | 2.865 | (ASP) | 0.456 | Plastic | 1.511 | 56.8 | −13.78 |
| 9 | | 1.927 | (ASP) | 0.330 | | | | |
| 10 | Lens 5 | 8.944 | (ASP) | 0.915 | Plastic | 1.566 | 37.6 | −33.69 |
| 11 | | 5.865 | (ASP) | 0.300 | | | | |
| 12 | IR-cut filter | Plano | | 0.300 | Glass | 1.517 | 64.2 | — |
| 13 | | Plano | | 0.338 | | | | |
| 14 | Image | Plano | | — | | | | |

Note:
Reference wavelength is 587.6 nm (d-line).

TABLE 16

Aspheric Coefficients

| Surface # | 2 | 3 | 4 | 5 | 6 |
|---|---|---|---|---|---|
| k = | −3.2633E−01 | 7.7810E+01 | 7.7810E+01 | −3.1686E+00 | −3.6826E+01 |
| A4 = | 1.1595E−02 | −1.3867E−01 | −1.3867E−01 | 5.9982E−04 | −1.9614E−01 |
| A6 = | 1.8786E−02 | 5.5822E−01 | 5.5822E−01 | 2.8889E−01 | 1.4770E−01 |
| A8 = | −1.4645E−02 | −8.4258E−01 | −8.4258E−01 | −9.4797E−01 | −3.0739E−01 |
| A10 = | 1.3280E−02 | 7.0409E−01 | 7.0409E−01 | 2.0198E+00 | 5.4767E−01 |
| A12 = | −1.2572E−03 | −2.3855E−01 | −2.3855E−01 | −2.1965E+00 | −4.7872E−01 |
| A14 = | — | — | — | 1.0060E+00 | 1.4821E−01 |

| Surface # | 7 | 8 | 9 | 10 | 11 |
|---|---|---|---|---|---|
| k = | 1.6879E+01 | 6.5571E−01 | −9.4698E+00 | 1.5003E+01 | 1.8188E−01 |
| A4 = | −1.3974E−01 | −2.6208E−01 | −1.1483E−01 | −1.2369E−01 | −8.1893E−02 |
| A6 = | 1.9681E−01 | 1.1002E−01 | 1.0689E−02 | 4.8155E−02 | 1.7395E−02 |
| A8 = | −2.9839E−01 | −8.9646E−02 | 6.1318E−03 | −1.3150E−02 | 2.9944E−03 |
| A10 = | 4.0440E−01 | 6.6852E−02 | −4.6630E−03 | 2.4441E−03 | −2.8515E−03 |
| A12 = | −2.5432E−01 | −2.5770E−02 | 2.2593E−03 | −2.0712E−04 | 7.0637E−04 |
| A14 = | 6.7990E−02 | 4.9899E−03 | −5.6223E−04 | −1.0930E−05 | −8.0471E−05 |
| A16 = | — | −4.0103E−04 | 5.0458E−05 | 2.2871E−06 | 3.6547E−06 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 4.99 | T23 | 0.41 |
| Fno | 2.66 | T34 | 0.59 |
| HFOV [deg.] | 30.1 | T34/(T12 + T23 + T45) | 0.78 |
| V2 | 28.2 | T45 | 0.33 |
| V2 + V3 + V5 | 85.3 | TL/f | 1.06 |
| V3 | 19.5 | (R3 + R4)/(R3 − R4) | 0.50 |
| V3 + V5 | 57.1 | f/R9 | 0.56 |
| V4/V5 | 1.51 | f/SD52 | 2.10 |

-continued

| 8th Embodiment | | | |
|---|---|---|---|
| V5 | 37.6 | f123/f45 | −0.49 |
| CT2/T12 | 23.00 | Yc41/SD41 | 0.41 |
| T12 | 0.01 | — | — |

9th Embodiment

Figure 17:
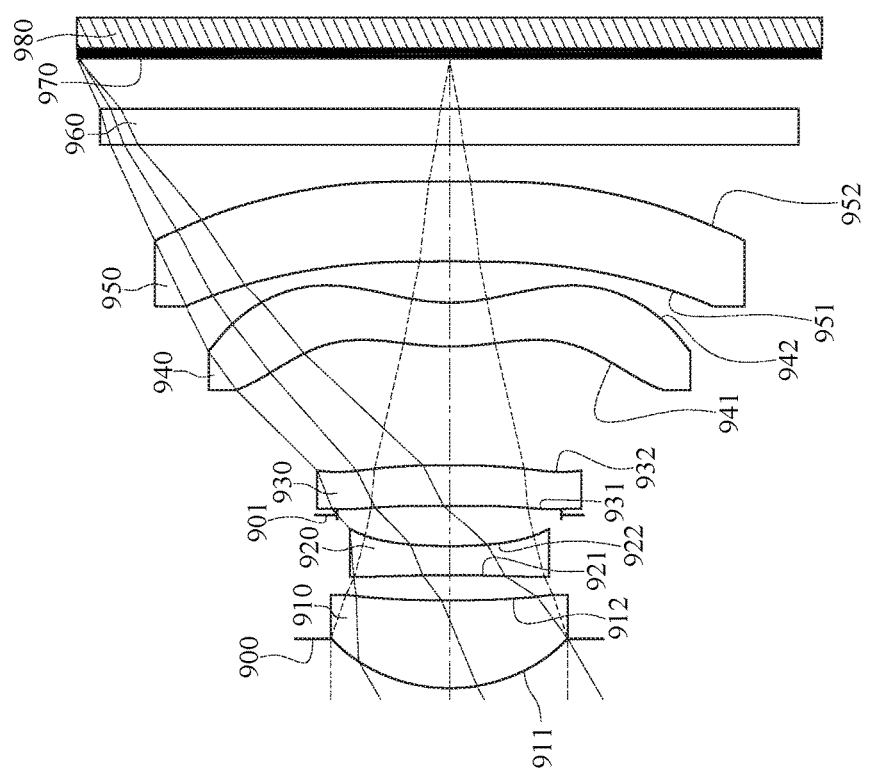
FIG. 17 a schematic view of an image capturing unit according to the 9th embodiment of the present disclosure.
Figure 18:
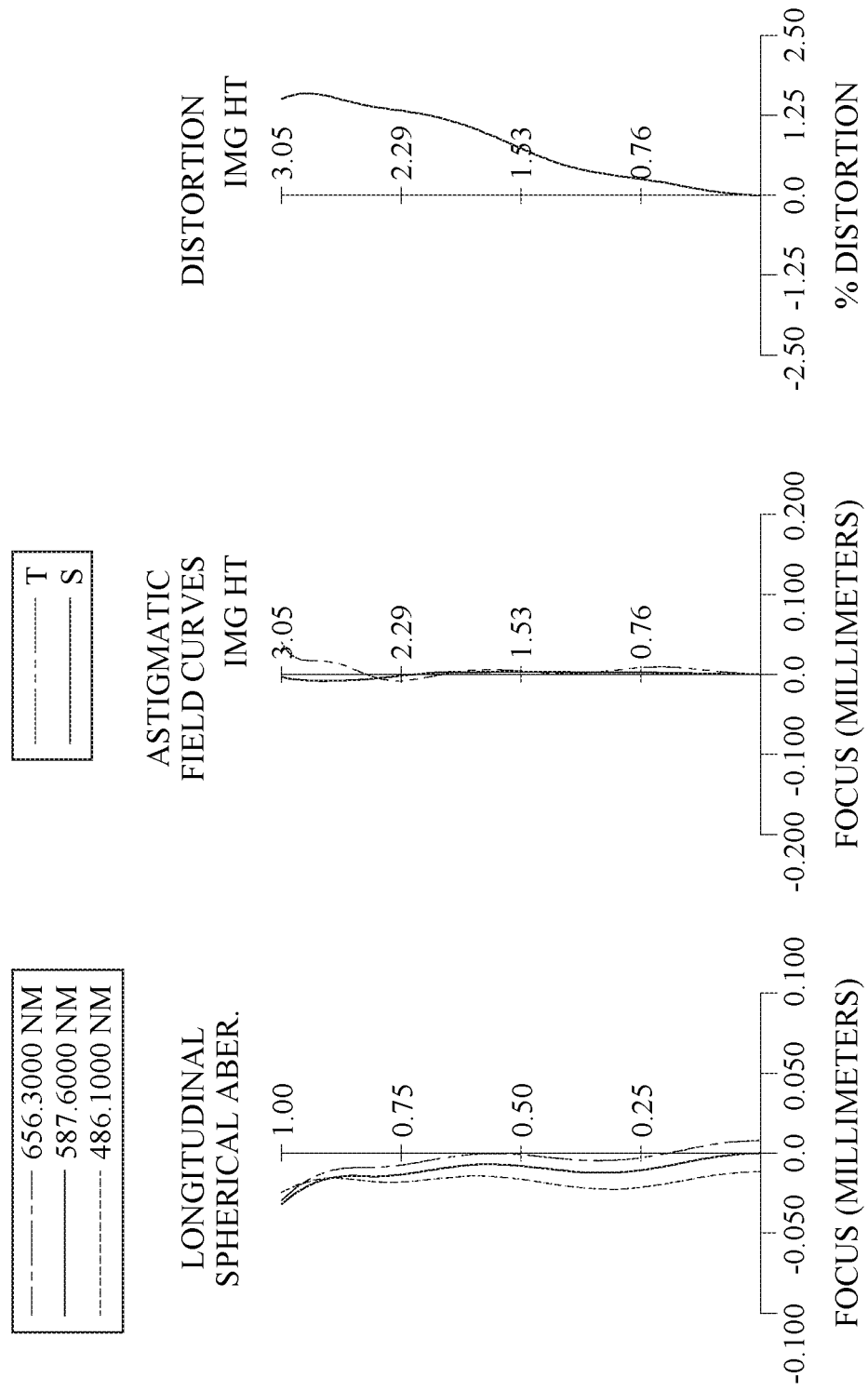
FIG. 18 shows spherical aberration curves, astigmatic field curves and a distortion curve of the image capturing unit according to the 9th embodiment.

FIG. 17 is a schematic view of an image capturing unit according to the 9th embodiment of the present disclosure. FIG. 18 shows, in order from left to right, spherical aberration curves, astigmatic field curves and a distortion curve of the image capturing unit according to the 9th embodiment. In FIG. 17, the image capturing unit includes the photographing optical lens system (its reference numeral is omitted) of the present disclosure and an image sensor 980. The photographing optical lens system includes, in order from an object side to an image side, an aperture stop 900, a first lens element 910, a second lens element 920, a stop

901, a third lens element 930, a fourth lens element 940, a fifth lens element 950, an IR-cut filter 960 and an image surface 970, wherein the photographing optical lens system has a total of five lens elements (910-950).

The first lens element 910 with positive refractive power has an object-side surface 911 being convex in a paraxial region thereof and an image-side surface 912 being concave in a paraxial region thereof. The first lens element 910 is made of plastic material and has the object-side surface 911 and the image-side surface 912 being both aspheric.

The second lens element 920 with negative refractive power has an object-side surface 921 being concave in a paraxial region thereof and an image-side surface 922 being concave in a paraxial region thereof. The second lens element 920 is made of plastic material and has the object-side surface 921 and the image-side surface 922 being both aspheric.

The third lens element 930 with positive refractive power has an object-side surface 931 being convex in a paraxial region thereof and an image-side surface 932 being convex in a paraxial region thereof. The third lens element 930 is made of plastic material and has the object-side surface 931 and the image-side surface 932 being both aspheric. Both the object-side surface 931 and the image-side surface 932 of the third lens element 930 have at least one inflection point.

The fourth lens element 940 with negative refractive power has an object-side surface 941 being convex in a paraxial region thereof and an image-side surface 942 being concave in a paraxial region thereof. The fourth lens element 940 is made of plastic material and has the object-side surface 941 and the image-side surface 942 being both aspheric. The object-side surface 941 of the fourth lens element 940 has at least one concave critical point in an off-axial region thereof. The image-side surface 942 of the fourth lens element 940 has at least one convex critical point in an off-axial region thereof.

The fifth lens element 950 with negative refractive power has an object-side surface 951 being concave in a paraxial region thereof and an image-side surface 952 being concave in a paraxial region thereof. The fifth lens element 950 is made of plastic material and has the object-side surface 951 and the image-side surface 952 being both aspheric. The image-side surface 952 of the fifth lens element 950 has at least one convex critical point in an off-axial region thereof.

The IR-cut filter 960 is made of glass material and located between the fifth lens element 950 and the image surface 970, and will not affect the focal length of the photographing optical lens system. The image sensor 980 is disposed on or near the image surface 970 of the photographing optical lens system.

The detailed optical data of the 9th embodiment are shown in Table 17 and the aspheric surface data are shown in Table 18 below.

TABLE 17

9th Embodiment
f = 5.19 mm, Fno = 2.66, HFOV = 30.1 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.408 | | | | |
| 2 | Lens 1 | 1.399 (ASP) | 0.724 | Plastic | 1.544 | 56.0 | 2.89 |
| 3 | | 10.507 (ASP) | 0.209 | | | | |
| 4 | Lens 2 | −9.563 (ASP) | 0.237 | Plastic | 1.642 | 22.5 | −4.27 |
| 5 | | 3.874 (ASP) | 0.264 | | | | |
| 6 | Stop | Plano | 0.075 | | | | |
| 7 | Lens 3 | 688.857 (ASP) | 0.333 | Plastic | 1.660 | 20.4 | 17.78 |
| 8 | | −11.938 (ASP) | 0.978 | | | | |
| 9 | Lens 4 | 2.184 (ASP) | 0.362 | Plastic | 1.511 | 56.8 | −11.70 |
| 10 | | 1.510 (ASP) | 0.339 | | | | |
| 11 | Lens 5 | −39.496 (ASP) | 0.663 | Plastic | 1.660 | 20.4 | −43.28 |
| 12 | | 103.916 (ASP) | 0.300 | | | | |
| 13 | IR-cut filter | Plano | 0.300 | Glass | 1.517 | 64.2 | — |
| 14 | | Plano | 0.414 | | | | |
| 15 | Image | Plano | — | | | | |

Note:
Reference wavelength is 587.6 nm (d-line).
An effective radius of the stop 901 (Surface 6) is 0.925 mm.

TABLE 18

Aspheric Coefficients

| Surface # | 2 | 3 | 4 | 5 | 7 |
|---|---|---|---|---|---|
| k = | −2.0897E−01 | 6.1561E+01 | −2.4950E+01 | −3.3329E+01 | −9.9000E+01 |
| A4 = | 1.0995E−02 | −1.7695E−02 | −1.5148E−02 | 4.5461E−02 | −1.9714E−01 |
| A6 = | 1.1509E−02 | 1.1124E−01 | 2.8617E−01 | 4.4508E−01 | 2.8634E−01 |
| A8 = | 1.3012E−02 | −1.7753E−01 | −4.8742E−01 | −1.0804E+00 | −3.2497E−01 |
| A10 = | −1.5546E−02 | 1.8094E−01 | 3.9094E−01 | 2.0368E+00 | 5.4283E−01 |
| A12 = | 1.4841E−02 | −9.1529E−02 | −1.7566E−01 | −2.1965E+00 | −4.7895E−01 |
| A14 = | — | — | — | 1.0060E+00 | 1.4808E−01 |

TABLE 18-continued

| Aspheric Coefficients | | | | | |
|---|---|---|---|---|---|
| Surface # | 8 | 9 | 10 | 11 | 12 |
| k = | −9.9000E+01 | −1.7361E+00 | −5.2037E+00 | 6.1887E+01 | −9.9000E+01 |
| A4 = | −1.6002E−01 | −2.7402E−01 | −1.2677E−01 | −6.3145E−02 | −6.2831E−02 |
| A6 = | 2.3315E−01 | 1.2123E−01 | 2.2166E−02 | 3.6785E−02 | 1.7402E−02 |
| A8 = | −2.7941E−01 | −9.5814E−02 | 2.2496E−02 | −1.2981E−02 | 2.2699E−03 |
| A10 = | 3.9474E−01 | 6.7509E−02 | −4.7893E−03 | 2.4654E−03 | −2.7890E−03 |
| A12 = | −2.6690E−01 | −2.5542E−02 | 2.3748E−03 | −1.9165E−04 | 7.1875E−04 |
| A14 = | 6.1849E−02 | 4.8595E−03 | −5.5315E−04 | −4.9096E−06 | −8.0644E−05 |
| A16 = | — | −3.7016E−04 | 4.8345E−05 | 1.1080E−06 | 3.4282E−06 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 5.19 | T23 | 0.34 |
| Fno | 2.66 | T34 | 0.98 |
| HFOV [deg.] | 30.1 | T34/(T12 + T23 + T45) | 1.10 |
| V2 | 22.5 | T45 | 0.34 |
| V2 + V3 + V5 | 63.3 | TL/f | 1.00 |
| V3 | 20.4 | (R3 + R4)/(R3 − R4) | 0.42 |
| V3 + V5 | 40.8 | f/R9 | −0.13 |
| V4/V5 | 2.78 | f/SD52 | 2.14 |
| V5 | 20.4 | f123/f45 | −0.50 |
| CT2/T12 | 1.13 | Yc41/SD41 | 0.41 |
| T12 | 0.21 | — | — |

10th Embodiment

Figure 19:
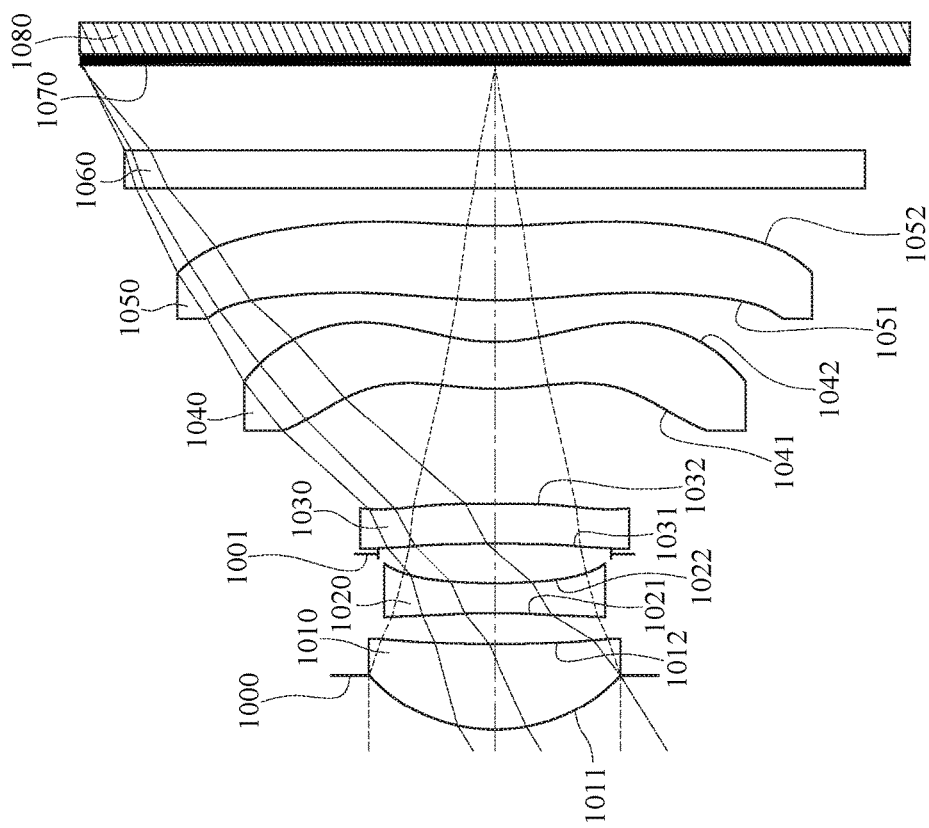
FIG. 19 a schematic view of an image capturing unit according to the 10th embodiment of the present disclosure.
Figure 20:
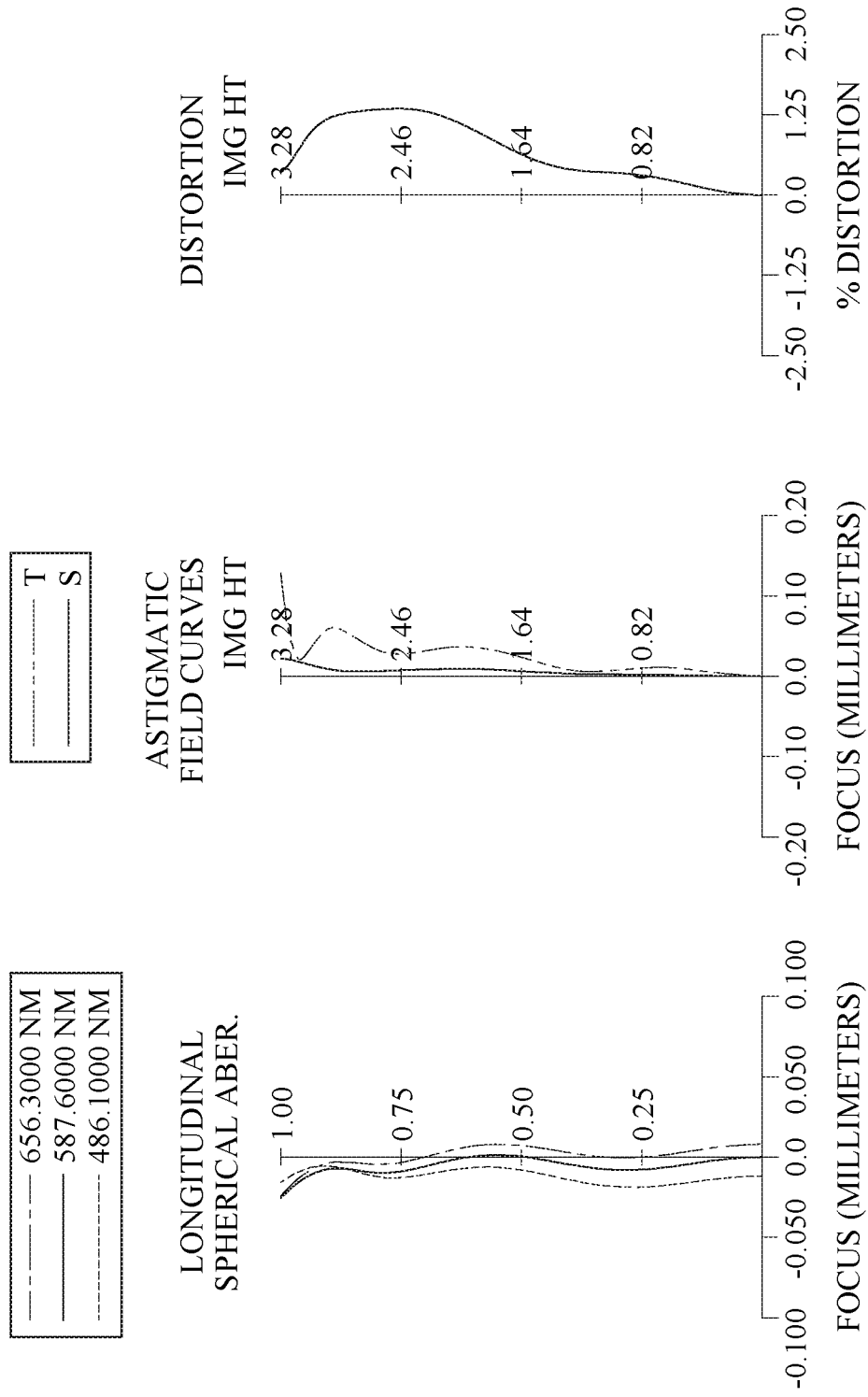
FIG. 20 shows spherical aberration curves, astigmatic field curves and a distortion curve of the image capturing unit according to the 10th embodiment.

FIG. 19 is a schematic view of an image capturing unit according to the 10th embodiment of the present disclosure. FIG. 20 shows, in order from left to right, spherical aberration curves, astigmatic field curves and a distortion curve of the image capturing unit according to the 10th embodiment. In FIG. 19, the image capturing unit includes the photographing optical lens system (its reference numeral is omitted) of the present disclosure and an image sensor 1080. The photographing optical lens system includes, in order from an object side to an image side, an aperture stop 1000, a first lens element 1010, a second lens element 1020, a stop 1001, a third lens element 1030, a fourth lens element 1040, a fifth lens element 1050, an IR-cut filter 1060 and an image surface 1070, wherein the photographing optical lens system has a total of five lens elements (1010-1050).

The first lens element 1010 with positive refractive power has an object-side surface 1011 being convex in a paraxial region thereof and an image-side surface 1012 being concave in a paraxial region thereof. The first lens element 1010 is made of glass material and has the object-side surface 1011 and the image-side surface 1012 being both aspheric.

The second lens element 1020 with negative refractive power has an object-side surface 1021 being concave in a paraxial region thereof and an image-side surface 1022 being concave in a paraxial region thereof. The second lens element 1020 is made of plastic material and has the object-side surface 1021 and the image-side surface 1022 being both aspheric.

The third lens element 1030 with positive refractive power has an object-side surface 1031 being convex in a paraxial region thereof and an image-side surface 1032 being convex in a paraxial region thereof. The third lens element 1030 is made of plastic material and has the object-side surface 1031 and the image-side surface 1032 being both aspheric. Both the object-side surface 1031 and the image-side surface 1032 of the third lens element 1030 have at least one inflection point.

The fourth lens element 1040 with negative refractive power has an object-side surface 1041 being convex in a paraxial region thereof and an image-side surface 1042 being concave in a paraxial region thereof. The fourth lens element 1040 is made of plastic material and has the object-side surface 1041 and the image-side surface 1042 being both aspheric. The object-side surface 1041 of the fourth lens element 1040 has at least one concave critical point in an off-axial region thereof. The image-side surface 1042 of the fourth lens element 1040 has at least one convex critical point in an off-axial region thereof.

The fifth lens element 1050 with positive refractive power has an object-side surface 1051 being convex in a paraxial region thereof and an image-side surface 1052 being concave in a paraxial region thereof. The fifth lens element 1050 is made of plastic material and has the object-side surface 1051 and the image-side surface 1052 being both aspheric. The image-side surface 1052 of the fifth lens element 1050 has at least one convex critical point in an off-axial region thereof.

The IR-cut filter 1060 is made of glass material and located between the fifth lens element 1050 and the image surface 1070, and will not affect the focal length of the photographing optical lens system. The image sensor 1080 is disposed on or near the image surface 1070 of the photographing optical lens system.

The detailed optical data of the 10th embodiment are shown in Table 19 and the aspheric surface data are shown in Table 20 below.

TABLE 19

10th Embodiment
f = 5.29 mm, Fno = 2.65, HFOV = 31.7 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.431 | | | | |
| 2 | Lens 1 | 1.388 (ASP) | 0.683 | Glass | 1.507 | 70.5 | 3.02 |
| 3 | | 12.273 (ASP) | 0.244 | | | | |
| 4 | Lens 2 | −6.844 (ASP) | 0.238 | Plastic | 1.584 | 28.2 | −4.85 |
| 5 | | 4.897 (ASP) | 0.232 | | | | |
| 6 | Stop | Plano | 0.080 | | | | |
| 7 | Lens 3 | 91.466 (ASP) | 0.319 | Plastic | 1.614 | 26.0 | 25.03 |
| 8 | | −18.440 (ASP) | 0.916 | | | | |
| 9 | Lens 4 | 2.457 (ASP) | 0.371 | Plastic | 1.511 | 56.8 | −8.17 |
| 10 | | 1.468 (ASP) | 0.330 | | | | |
| 11 | Lens 5 | 4.119 (ASP) | 0.590 | Plastic | 1.614 | 26.0 | 29.34 |
| 12 | | 5.050 (ASP) | 0.300 | | | | |
| 13 | IR-cut filter | Plano | 0.300 | Glass | 1.517 | 64.2 | — |
| 14 | | Plano | 0.684 | | | | |
| 15 | Image | Plano | — | | | | |

Note:
Reference wavelength is 587.6 nm (d-line).
An effective radius of the stop 1001 (Surface 6) is 0.925 mm.
An effective radius of the image-side surface 1052 (Surface 12) is 2.520 mm.

TABLE 20

Aspheric Coefficients

| Surface # | 2 | 3 | 4 | 5 | 7 |
|---|---|---|---|---|---|
| k = | −6.2732E−01 | 1.1702E+01 | −1.9845E+01 | −5.0184E+01 | 9.0000E+01 |
| A4 = | 2.8400E−02 | −1.9599E−02 | −1.7953E−02 | 2.7603E−02 | −2.0629E−01 |
| A6 = | 1.6984E−02 | 1.0958E−01 | 2.8851E−02 | 4.3322E−01 | 2.7685E−01 |
| A8 = | 9.9928E−03 | −1.8561E−01 | −5.2021E−01 | −1.0723E+00 | −3.1011E−01 |
| A10 = | −8.3833E−03 | 1.7820E−01 | 4.5124E−01 | 2.0484E+00 | 5.2585E−01 |
| A12 = | 9.7395E−03 | −7.4395E−02 | −1.8233E−01 | −2.1636E+00 | −4.7872E−01 |
| A14 = | — | — | — | 9.5747E−01 | 1.4821E−01 |

| Surface # | 8 | 9 | 10 | 11 | 12 |
|---|---|---|---|---|---|
| k = | 4.5810E+01 | −7.6297E−01 | −5.3306E+00 | −1.4964E+01 | −2.0762E+01 |
| A4 = | −1.5789E−01 | −2.7473E−01 | −1.1533E−01 | −7.4093E−02 | −7.0136E−02 |
| A6 = | 2.3261E−01 | 1.1920E−01 | 2.0163E−02 | 3.8053E−02 | 1.8906E−02 |
| A8 = | −2.8000E−01 | −9.5741E−02 | 1.9808E−03 | −1.2789E−02 | 2.3052E−03 |
| A10 = | 4.0337E−01 | 6.7633E−02 | −4.7167E−03 | 2.4600E−03 | −2.8176E−03 |
| A12 = | −2.8137E−01 | −2.5454E−02 | 2.4093E−03 | −1.9785E−04 | 7.1939E−04 |
| A14 = | 6.7885E−02 | 4.8479E−03 | −5.4878E−04 | −5.6359E−06 | −8.0830E−05 |
| A16 = | — | −3.7427E−04 | 4.5581E−05 | 1.1462E−06 | 3.4333E−06 |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from Table 19 and Table 20 as the following values and satisfy the following conditions:

| 10th Embodiment | | | |
|---|---|---|---|
| f [mm] | 5.29 | T23 | 0.31 |
| Fno | 2.65 | T34 | 0.92 |
| HFOV [deg.] | 31.7 | T34/(T12 + T23 + T45) | 1.03 |
| V2 | 28.2 | T45 | 0.33 |
| V2 + V3 + V5 | 80.2 | TL/f | 1.00 |
| V3 | 26.0 | (R3 + R4)/(R3 − R4) | 0.17 |
| V3 + V5 | 52.0 | f/R9 | 1.29 |
| V4/V5 | 2.18 | f/SD52 | 2.10 |
| V5 | 26.0 | f123/f45 | −0.46 |
| CT2/T12 | 0.98 | Yc41/SD41 | 0.41 |
| T12 | 0.24 | — | — |

11th Embodiment

Figure 22:
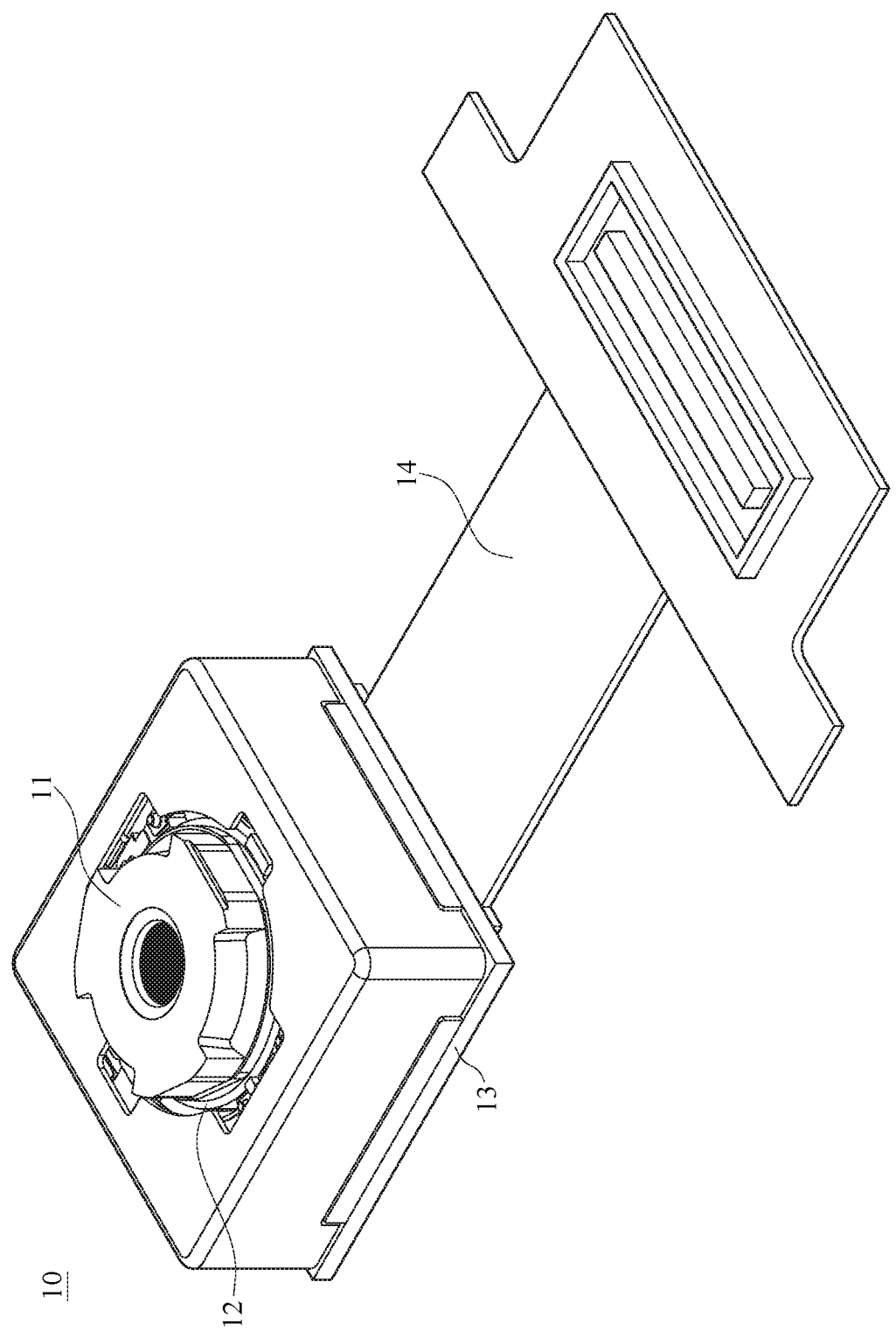
FIG. 22 is a perspective view of an image capturing unit according to the 11th embodiment of the present disclosure.

FIG. 22 is a perspective view of an image capturing unit according to the 11th embodiment of the present disclosure. In this embodiment, an image capturing unit 10 is a camera module including a camera shot 11, a driving device 12, an image sensor 13 and a cable 14. The camera shot 11 includes the photographing optical lens system disclosed in the first embodiment, a barrel and a holder member (their reference numerals are omitted) for holding the photographing optical lens system. The external light converges into the camera shot 11 of the image capturing unit 10 to generate an image, and the camera shot 11 is cooperated with the driving device 12 to focus the image on the image sensor 13. The image is digitally transmitted to an electronic component by the cable 14.

The driving device 12 can have auto focus function, and the driving device 12 may include voice coil motors (VCM), micro electro-mechanical systems (MEMS), piezoelectric systems or shape memory alloys. The driving device 12 is favorable for the photographing optical lens system to obtain a better imaging position, so that a clear image of the imaged object can be captured by the photographing optical lens system under different object distances. The image sensor 13 (for example, CCD or CMOS) features high sensitivity to light and low noise, and the image sensor 13 can be disposed on the image surface of the photographing optical lens system to provide actual image quality.

12th Embodiment

Figure 23:
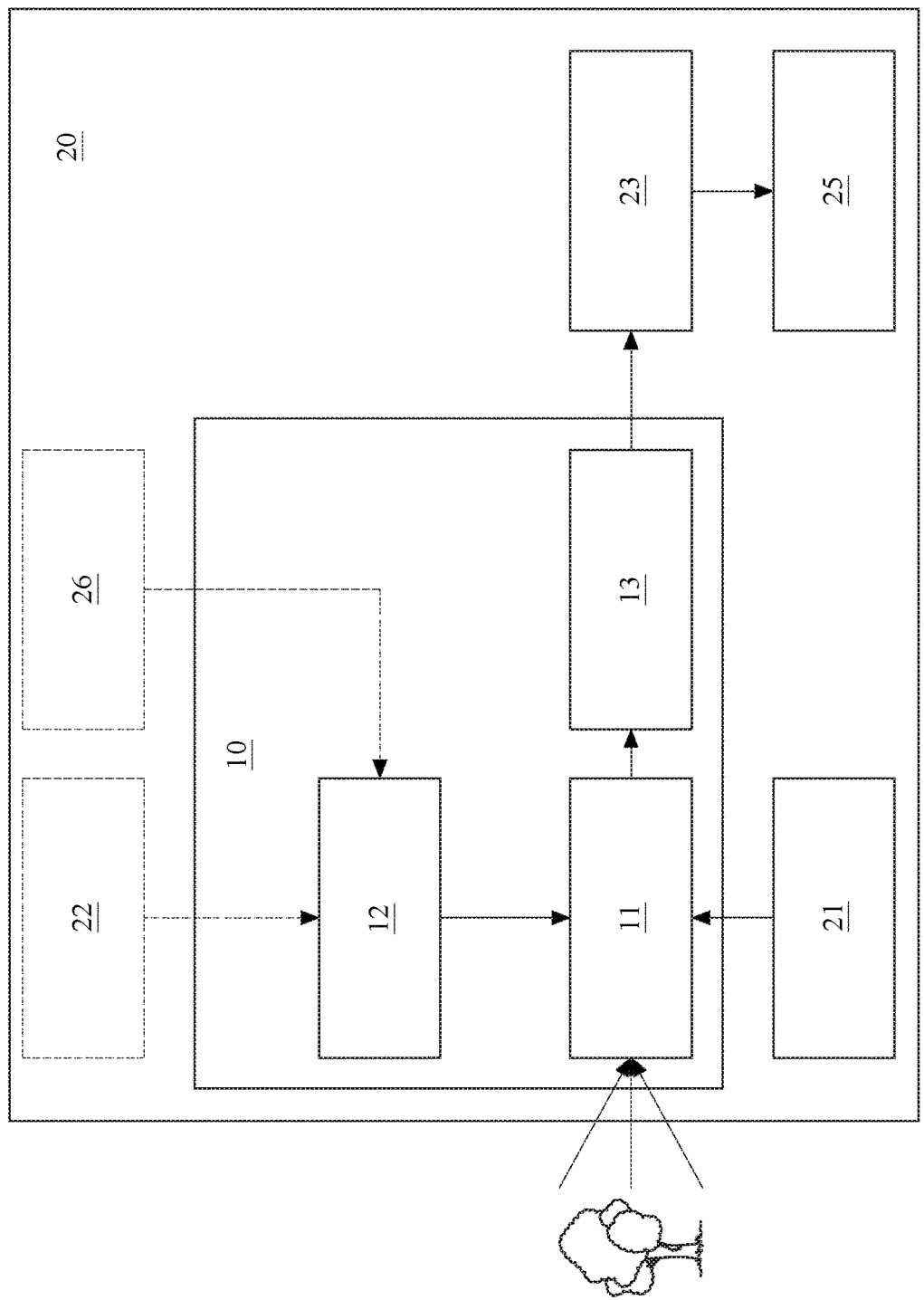
FIG. 23 is a schematic view of an electronic device according to the 12th embodiment of the present disclosure.
Figure 24:
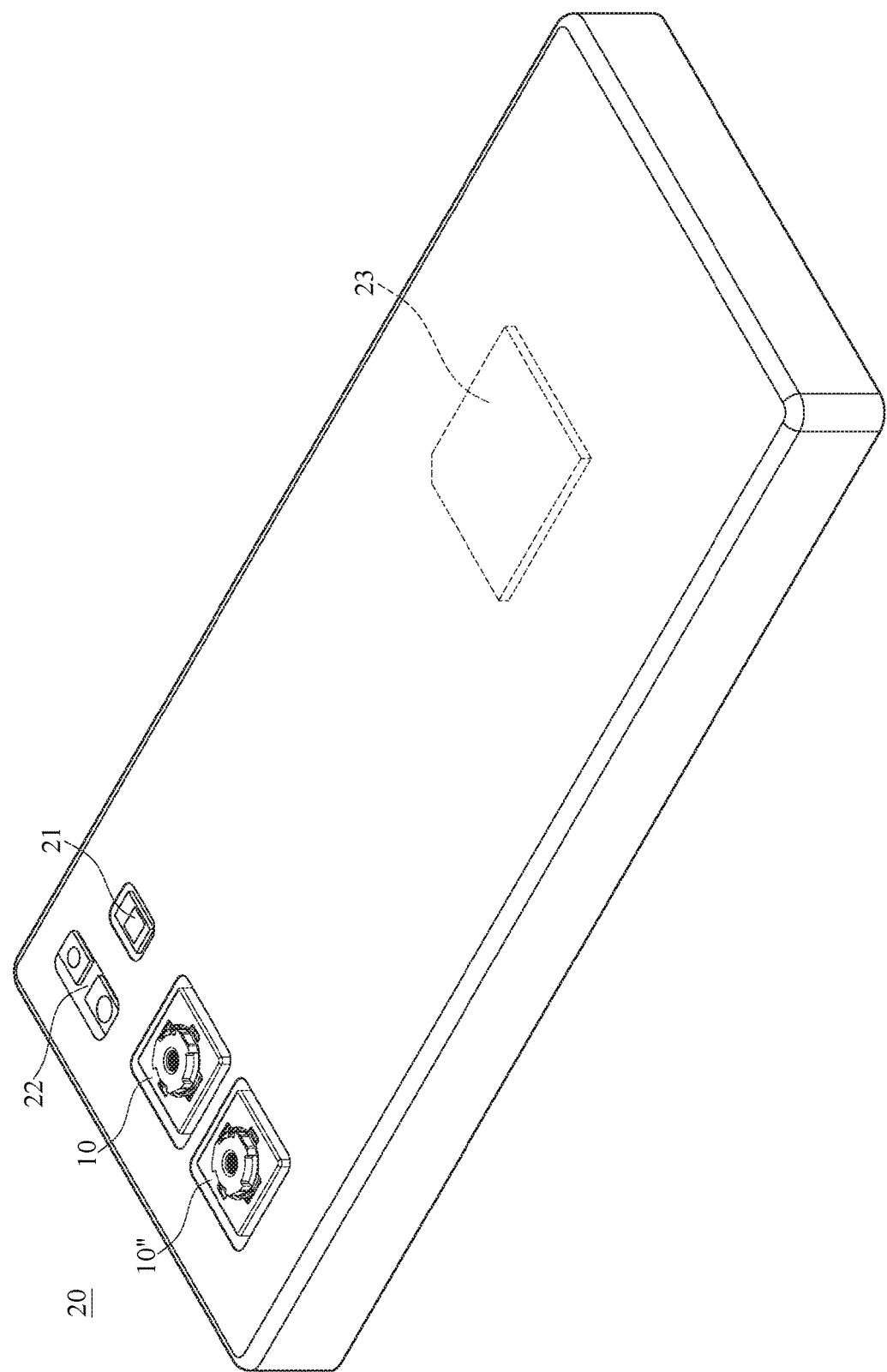
FIG. 24 is a perspective view of the electronic device in FIG. 23.
Figure 25:
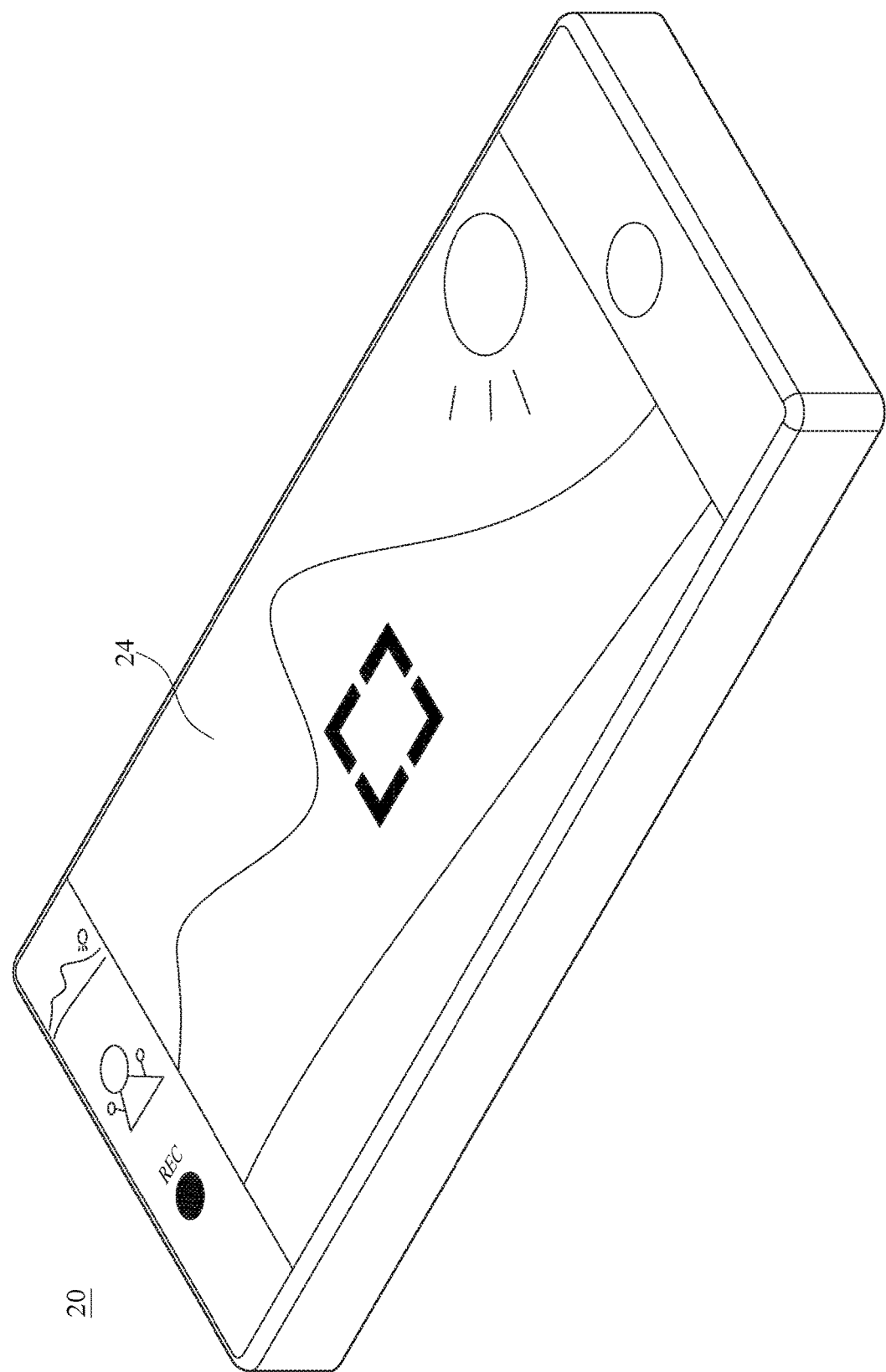
FIG. 25 is another perspective view of the electronic device in FIG. 23.

FIG. 23 is a schematic view of an electronic device according to the 12th embodiment of the present disclosure. FIG. 24 is a perspective view of the electronic device in FIG. 23. FIG. 25 is another perspective view of the electronic device in FIG. 23. In this embodiment, an electronic device 20 is a smart phone including the image capturing unit 10 disclosed in the eleventh embodiment, a flash light module 21, a focus assist module 22, an image signal processor 23, an user interface 24 and an image software processor 25. In this embodiment, the electronic device 20 further includes an image capturing unit 10″, wherein the image capturing unit 10 is a telephoto camera, and the image capturing unit 10″ is a wide angle camera, but the disclosure is not limited thereto. For example, both the image capturing units 10 and 10″ can be a telephoto camera.

The driving device 12 of the image capturing unit 10 can be cooperated with a dynamic sensing element 26, such as an acceleration, a gyroscope and a hall effect sensor, so that the driving device 12 can provide optical image stabilization (OIS). The driving device 12 cooperated with the dynamic sensing element 26 is favorable for compensating for pan and tilt of the camera shot 11 to reduce blurring associated with the motion during exposure. In some cases, the compensation can be provided by electronic image stabilization (EIS), thereby improving image quality of the image in motion condition or low-light condition.

When a user interacts with the user interface 24 to capture images, light converges into the image capturing unit 10 to generate image, and the flash light module 21 is activated for light supplement. The focus assist module 22 detects the object distance of the imaged object to achieve fast image auto focus. The image signal processor 23 is configured to optimize the captured image to improve image quality. The light beam emitted from focus assist module 22 can be either infrared light or laser. The user interface 24 can be a touch screen or a shutter button. The user is able to interact with the user interface 24 and the image software processor 25 having multiple functions to capture images and complete image processing.

The smart phone in this embodiment is only exemplary for showing the image capturing unit 10 of the present disclosure installed in an electronic device, and the present disclosure is not limited thereto. The image capturing unit 10 can be optionally applied to optical systems with a movable focus. Furthermore, the photographing optical lens system of the image capturing unit 10 is featured with good capability in aberration corrections and high image quality, and can be applied to 3D (three-dimensional) image capturing applications, in products such as digital cameras, mobile devices, digital tablets, wearable devices, smart televisions, network surveillance devices, motion sensing input devices and other electronic imaging devices.

The foregoing description, for the purpose of explanation, has been described with reference to specific embodiments. It is to be noted that TABLES 1-20 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A photographing optical lens system comprising, in order from an object side to an image side:
   a first lens element having positive refractive power;
   a second lens element having negative refractive power;
   a third lens element, wherein, either an object-side surface of the third lens element, an image-side surface of the third lens element or both the object-side surface and the image-side surface of the third lens element are aspheric;
   a fourth lens element with negative refractive power having an object-side surface being convex in a paraxial region thereof and an image-side surface being concave in a paraxial region thereof; wherein, either the object-side surface of the fourth lens element, the image-side surface of the fourth lens element or both the object-side surface and the image-side surface of the fourth lens element have at least one critical point in an off-axial region thereof, and either the object-side surface of the fourth lens element, the image-side surface of the fourth lens element or both the object-side surface and the image-side surface of the fourth lens element are aspheric; and
   a fifth lens element;
   wherein the at least one critical point is a non-axial point of the object-side surface or the image-side surface of the fourth lens element where its tangent is perpendicular to an optical axis;
   wherein the photographing optical lens system has a total of five lens elements, an Abbe number of the third lens element is V3, an Abbe number of the fifth lens element is V5, and the following condition is satisfied:

$20.0 < V3 + V5 < 70.0$.

2. The photographing optical lens system of claim 1, wherein an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, and the following condition is satisfied:

$0.35 < T34/(T12+T23+T45) < 1.35$.

3. The photographing optical lens system of claim 2, wherein the axial distance between the first lens element and the second lens element is T12, the axial distance between the second lens element and the third lens element is T23, the axial distance between the third lens element and the fourth lens element is T34, the axial distance between the fourth lens element and the fifth lens element is T45, and the following condition is satisfied:

$0.50<T34/(T12+T23+T45)<1.25$.

4. The photographing optical lens system of claim 1, wherein a curvature radius of an object-side surface of the second lens element is R3, a curvature radius of an image-side surface of the second lens element is R4, and the following condition is satisfied:

$-2.50<(R3+R4)/(R3-R4)<1.85$.

5. The photographing optical lens system of claim 4, wherein the curvature radius of the object-side surface of the second lens element is R3, the curvature radius of the image-side surface of the second lens element is R4, and the following condition is satisfied:

$-2.50<(R3+R4)/(R3-R4)<0.53$.

6. The photographing optical lens system of claim 1, wherein an Abbe number of the second lens element is V2, the Abbe number of the third lens element is V3, the Abbe number of the fifth lens element is V5, and the following conditions are satisfied:

$10<V2<28$;

$10<V3<28$; and $10<V5<28$.

7. The photographing optical lens system of claim 1, wherein an Abbe number of the fourth lens element is V4, the Abbe number of the fifth lens element is V5, and the following condition is satisfied:

$1.30<V4/V5<6.00$.

8. The photographing optical lens system of claim 1, wherein a central thickness of the second lens element is CT2, an axial distance between the first lens element and the second lens element is T12, and the following condition is satisfied:

$0.25<CT2/T12<1.80$.

9. The photographing optical lens system of claim 1, wherein an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, and the following conditions are satisfied:

T12<T34;

T23<T34, and

T45<T34.

10. The photographing optical lens system of claim 1, wherein an axial distance between an object-side surface of the first lens element and an image surface is TL, a focal length of the photographing optical lens system is f, and the following condition is satisfied:

$0.70<TL/f<1.10$.

11. The photographing optical lens system of claim 1, wherein a focal length of the photographing optical lens system is f, a curvature radius of an object-side surface of the fifth lens element is R9, and the following condition is satisfied:

$-0.28<f/R9<1.70$.

12. The photographing optical lens system of claim 1, wherein a focal length of the photographing optical lens system is f, a maximum effective radius of an image-side surface of the fifth lens element is SD52, and the following condition is satisfied:

$1.95<f/SD52<5.0$.

13. The photographing optical lens system of claim 1, wherein a composite focal length of the first lens element, the second lens element and the third lens element is f123, a composite focal length of the fourth lens element and the fifth lens element is f45, and the following condition is satisfied:

$-1.0<f123/f45<-0.45$.

14. The photographing optical lens system of claim 1, wherein the object-side surface of the fourth lens element has at least one concave critical point in an off-axial region thereof, and the at least one concave critical point is a non-axial point with a concave shape of the object-side surface of the fourth lens element where its tangent is perpendicular to the optical axis; a vertical distance between the at least one concave critical point on the object-side surface of the fourth lens element and the optical axis is Yc41, a maximum effective radius of the object-side surface of the fourth lens element is SD41, and the following condition is satisfied:

$0.05<Yc41/SD41<0.50$.

15. The photographing optical lens system of claim 1, wherein a focal length of the first lens element is less than an absolute value of a focal length of the second lens element, an absolute value of a focal length of the third lens element, an absolute value of a focal length of the fourth lens element and an absolute value of a focal length of the fifth lens element.

16. The photographing optical lens system of claim 1, wherein, either the object-side surface of the third lens element, the image-side surface of the third lens element or both the object-side surface and the image-side surface of the third lens element have at least one inflection point.

17. The photographing optical lens system of claim 1, wherein the fifth lens element has an object-side surface being convex in a paraxial region thereof.

18. The photographing optical lens system of claim 1, wherein the fifth lens element has an image-side surface being concave in a paraxial region thereof, the image-side surface of the fifth lens element has at least one convex critical point in an off-axial region thereof, and the at least one convex critical point is a non-axial point with a convex shape of the image-side surface of the fifth lens element where its tangent is perpendicular to the optical axis.

19. An image capturing unit, comprising:
the photographing optical lens system of claim 1;
a driving device disposed on the photographing optical lens system; and
an image sensor disposed on an image surface of the photographing optical lens system.

20. An electronic device, comprising:
the image capturing unit of claim 19.

21. A photographing optical lens system comprising, in order from an object side to an image side:
  a first lens element having positive refractive power;
  a second lens element having negative refractive power;
  a third lens element;
  a fourth lens element with negative refractive power having an object-side surface being convex in a paraxial region thereof and an image-side surface being concave in a paraxial region thereof; wherein, either the object-side surface of the fourth lens element, the image-side surface of the fourth lens element or both the object-side surface and the image-side surface of the fourth lens element have at least one critical point in an off-axial region thereof, and either the object-side surface of the fourth lens element, the image-side surface of the fourth lens element or both the object-side surface and the image-side surface of the fourth lens element are aspheric; and
  a fifth lens element;
  wherein the at least one critical point is a non-axial point of the object-side surface or the image-side surface of the fourth lens element where its tangent is perpendicular to an optical axis;
  wherein the photographing optical lens system has a total of five lens elements, an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, an Abbe number of the fourth lens element is V4, an Abbe number of the fifth lens element is V5, a composite focal length of the first lens element, the second lens element and the third lens element is f123, a composite focal length of the fourth lens element and the fifth lens element is f45, and the following conditions are satisfied:

$0.35 < T34/(T12+T23+T45) < 1.35;$ $1.30 < V4/V5 < 6.00;$ and $-1.0 < f123/f45 < -0.45.$ 22. The photographing optical lens system of claim 21, wherein the axial distance between the first lens element and the second lens element is T12, the axial distance between the second lens element and the third lens element is T23, the axial distance between the third lens element and the fourth lens element is T34, the axial distance between the fourth lens element and the fifth lens element is T45, and the following condition is satisfied:

$0.50 < T34/(T12+T23+T45) < 1.25.$

23. The photographing optical lens system of claim 21, wherein an Abbe number of the second lens element is V2, an Abbe number of the third lens element is V3, the Abbe number of the fifth lens element is V5, and the following conditions are satisfied:

$10 < V2 < 28;$ $10 < V3 < 28;$ and $10 < V5 < 28.$

24. The photographing optical lens system of claim 21, wherein an Abbe number of the second lens element is V2, an Abbe number of the third lens element is V3, the Abbe number of the fifth lens element is V5, and the following condition is satisfied:

$40.0 < V2+V3+V5 < 90.0.$

25. The photographing optical lens system of claim 21, wherein an axial distance between an object-side surface of the first lens element and an image surface is TL, a focal length of the photographing optical lens system is f, and the following condition is satisfied:

$0.70 < TL/f < 1.10.$

26. The photographing optical lens system of claim 21, wherein a curvature radius of an object-side surface of the second lens element is R3, a curvature radius of an image-side surface of the second lens element is R4, and the following condition is satisfied:

$-2.50 < (R3+R4)/(R3-R4) < 1.85.$

27. The photographing optical lens system of claim 21, wherein a focal length of the photographing optical lens system is f, a curvature radius of an object-side surface of the fifth lens element is R9, and the following condition is satisfied:

$-0.28 < f/R9 < 1.70.$

28. The photographing optical lens system of claim 21, wherein the object-side surface of the fourth lens element has at least one concave critical point in an off-axial region thereof, the at least one concave critical point is a non-axial point with a concave shape of the object-side surface of the fourth lens element where its tangent is perpendicular to the optical axis; a vertical distance between the at least one concave critical point on the object-side surface of the fourth lens element and the optical axis is Yc41, a maximum effective radius of the object-side surface of the fourth lens element is SD41, and the following condition is satisfied:

$0.05 < Yc41/SD41 < 0.50.$

29. The photographing optical lens system of claim 21, wherein the fifth lens element has an image-side surface being concave in a paraxial region thereof, the image-side surface of the fifth lens element has at least one convex critical point in an off-axial region thereof, and the at least one convex critical point is a non-axial point with a convex shape of the image-side surface of the fifth lens element where its tangent is perpendicular to the optical axis.

* * * * *